US008432562B2

(12) United States Patent
Ando et al.

(10) Patent No.: US 8,432,562 B2
(45) Date of Patent: Apr. 30, 2013

(54) IMAGE PROCESSING APPARATUS, METHOD, PROGRAM, AND COMPUTER READABLE RECORDING MEDIUM FOR CONTROLLING OPERATION SWITCHING AND DISPLAYING AT OCCURRENCE OF ERROR CONDITIONS

(75) Inventors: Mitsuo Ando, Fukuoka (JP); Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1427 days.

(21) Appl. No.: 11/057,256

(22) Filed: Feb. 15, 2005

(65) Prior Publication Data

US 2005/0226641 A1 Oct. 13, 2005

(30) Foreign Application Priority Data

Feb. 17, 2004 (JP) .................... 2004-040471
Feb. 8, 2005 (JP) .................... 2005-032175
Feb. 9, 2005 (JP) .................... 2005-033318

(51) Int. Cl.
G06F 3/1296 (2006.01)
G06F 9/45516 (2006.01)
G06F 8/65 (2006.01)
G06F 9/541 (2006.01)
G06K 15/00 (2006.01)
G03G 15/5016 (2006.01)

(52) U.S. Cl.
USPC .......... 358/1.15; 358/1.13; 358/1.14; 399/81; 717/148; 717/170; 719/328

(58) Field of Classification Search .......... None
See application file for complete search history.

(56) References Cited

U.S. PATENT DOCUMENTS

| 4,870,526 | A | 9/1989 | Maruta et al. |
| 4,937,762 | A | 6/1990 | Todome |
| 5,774,759 | A | 6/1998 | Tanaka |
| 6,823,523 | B1 * | 11/2004 | Campbell et al. ............. 719/318 |
| 7,408,657 | B2 * | 8/2008 | Suzuki et al. ................ 358/1.13 |
| 7,533,381 | B2 | 5/2009 | Ando |
| 2002/0054326 | A1 * | 5/2002 | Morita ........................ 358/1.15 |
| 2002/0141776 | A1 | 10/2002 | Hirakawa et al. |
| 2003/0044185 | A1 | 3/2003 | Kawaura |
| 2003/0063313 | A1 * | 4/2003 | Ito ............................... 358/1.15 |
| 2003/0184788 | A1 * | 10/2003 | Watanabe et al. ............ 358/1.13 |

(Continued)

FOREIGN PATENT DOCUMENTS

EP  0 864 933 A1  9/1998
JP  6-350791  12/1994

(Continued)

OTHER PUBLICATIONS

U.S. Appl. No. 11/509,601, filed Aug. 25, 2006, Ando et al.

(Continued)

*Primary Examiner* — Fan Zhang
(74) *Attorney, Agent, or Firm* — Oblon, Spivak, McClelland, Maier & Neustadt, L.L.P.

(57) ABSTRACT

An image forming apparatus has a new application management system. A platform provided in the image forming apparatus manages applications also provided in the image forming apparatus. An operation screen display application included in the application managed by the platform displays operation screens. Objects to be operated by the operation screens are the applications managed by the platform.

38 Claims, 31 Drawing Sheets

U.S. PATENT DOCUMENTS

| | | |
|---|---|---|
| 2003/0215256 A1 | 11/2003 | Osada |
| 2003/0217128 A1* | 11/2003 | Yanosy ......................... 709/223 |
| 2003/0223766 A1 | 12/2003 | Imai |
| 2004/0109188 A1* | 6/2004 | Akiyoshi et al. ............. 358/1.13 |
| 2004/0119751 A1* | 6/2004 | Yoshimi et al. ................ 345/773 |
| 2004/0128349 A1* | 7/2004 | Maruyama .................... 709/203 |
| 2004/0128532 A1* | 7/2004 | Ohishi et al. .................. 713/200 |
| 2004/0218208 A1* | 11/2004 | Akiyoshi et al. ............. 358/1.15 |
| 2004/0255263 A1* | 12/2004 | Ando ............................ 717/100 |

FOREIGN PATENT DOCUMENTS

| | | | |
|---|---|---|---|
| JP | 11-268380 | | 10/1999 |
| JP | 2000232551 | | 8/2000 |
| JP | 2000347875 A | * | 12/2000 |
| JP | 2001-201986 | | 7/2001 |
| JP | 2002-84383 | | 3/2002 |
| JP | 2002-244754 | | 8/2002 |
| JP | 2002-271539 | | 9/2002 |
| JP | 2003-182191 | | 7/2003 |
| JP | 2003-186704 | | 7/2003 |
| JP | 2003-256213 A | | 9/2003 |
| JP | 2003280844 | * | 10/2003 |
| JP | 2003-330671 | | 11/2003 |
| JP | 2004-312711 | | 11/2004 |
| WO | WO 03/101112 A1 | | 12/2003 |

OTHER PUBLICATIONS

U.S. Appl. No. 11/521,495, filed Sep. 15, 2006, Ando.
U.S. Appl. No. 11/521,567, filed Sep. 15, 2006, Ando.
Office Action issued Mar. 29, 2011, in Japanese Patent Application No. 2010-291668.
Office Action issued Jun. 21, 2011, in Japan Patent Application No. 2010-291668.
Japanese Office Action issued May 29, 2012 in Patent Application No. 2011-119342.
Japanese Office Action dated Feb. 5, 2013, in Japanese Patent Application No. 2011-119342.

* cited by examiner

FIG.7A

| JSDK MANAGER | | | | | | 2003/10/13 15:30 CLOSE |
|---|---|---|---|---|---|---|
| SELECT APPLICATION TO SWITCH. | | | | | | |
| SWITCH | START | END | SET | INSTALL | UNINSTALL | OPTION |

| NAME | EXPLANATION | TYPE | VERSION | LOCATION | STATUS |
|---|---|---|---|---|---|
| SimplePrint | EASY PRINT | WITH GUI | 1.2.3 | HDD | NORMAL |
| SimpleCopy | EASY COPY | WITH GUI | 1.0.0 | HDD | ABNORMAL |
| SimpleOcr | EASY OCR | WITHOUT GUI | 1.0.2 | SDcard | NORMAL |

1/1
▲ BACK
▼ NEXT

FIG.7B

| JSDK MANAGER | | | | | | 2003/10/13 15:30 CLOSE |
|---|---|---|---|---|---|---|
| SELECT APPLICATION TO START. | | | | | | |
| SWITCH | START | END | SET | INSTALL | UNINSTALL | OPTION |

| NAME | EXPLANATION | TYPE | VERSION | LOCATION |
|---|---|---|---|---|
| SimplePrint | EASY PRINT | WITH GUI | 1.2.3 | HDD |
| SimpleCopy | EASY COPY | WITH GUI | 1.0.0 | HDD |
| SimpleOcr | EASY OCR | WITHOUT GUI | 1.0.2 | SDcard |

1/1
▲ BACK
▼ NEXT

FIG.7C

| JSDK MANAGER | | | | | | 2003/10/13 15:30 CLOSE |
|---|---|---|---|---|---|---|
| SELECT APPLICATION TO END FORCIBLY. | | | | | | |
| SWITCH | START | END | SET | INSTALL | UNINSTALL | OPTION |

| STATUS | NAME | EXPLANATION | TYPE | VERSION | LOCATION |
|---|---|---|---|---|---|
| NORMAL | SimplePrint | EASY PRINT | WITH GUI | 1.2.3 | HDD |
| ABNORMAL | SimpleCopy | EASY COPY | WITH GUI | 1.0.0 | HDD |
| NORMAL | SimpleOcr | EASY OCR | WITHOUT GUI | 1.0.2 | SDcard |

1/1
▲ BACK
▼ NEXT

FIG.7D

| JSDK MANAGER | | | | | | 2003/10/13 15:30 CLOSE |
|---|---|---|---|---|---|---|
| SELECT APPLICATION TO INSTALL. | | | | | | |
| SWITCH | START | END | SET | INSTALL | UNINSTALL | OPTION |

| NAME | EXPLANATION | TYPE | VERSION | LOCATION | INSTALL STATUS |
|---|---|---|---|---|---|
| SimplePrint | EASY PRINT | WITH GUI | 1.2.3 | SDcard | NOT INSTALLED |
| SimpleCopy | EASY COPY | WITH GUI | 1.0.0 | Web | INSTALLED |
| SimpleOcr | EASY OCR | WITHOUT GUI | 1.0.2 | SDcard | NOT INSTALLED |

1/1
▲ BACK
▼ NEXT

FIG.7E

| JSDK MANAGER | | | | | | 2003/10/13 15:30 CLOSE |
|---|---|---|---|---|---|---|
| SELECT APPLICATION TO UNINSTALL. | | | | | | |
| SWITCH | START | END | SET | INSTALL | UNINSTALL | OPTION |

| NAME | EXPLANATION | TYPE | VERSION | LOCATION |
|---|---|---|---|---|
| SimplePrint | EASY PRINT | WITH GUI | 1.2.3 | HDD |
| SimpleCopy | EASY COPY | WITH GUI | 1.0.0 | HDD |
| SimpleOcr | EASY OCR | WITHOUT GUI | 1.0.2 | SDcard |

1/1
▲ BACK
▼ NEXT

FIG.17

```
<?xml version="1.0" encoding="utf-8"?>
<!-- JNLP File for JSDK Demo Application -->
<jnlp
    spec="1.0+"
    codebase="sdcard://jsdk/0123"
    href="jsdk_demo.jnlp">
  <information>
      <title> Jsdk Demo Application</title>                          ─── 1A
      <vendor>JSDK Providers Inc.</vendor>                           ─── 1B
    <telephone>092-441-####</telephone>                              ─── 1C
    <fax>092-411-####</fax>                                          ─── 1D
1 { <product-id>0123456</product-id>                                 ─── 1E
      <homepage href="docs/help.html"/>
      <description>JSDK Demo Application</description>
      <icon href="images/JSDK_demo.jpg"/>
      <offline-allowed/>
  </information>
  <security>
2 {     <all-permissions/>
  </security>
  <resources>
      < jsdk version="1.0"/>                                         ─── 3A
3 {   < jar hrel="JSDKdemo.jar" version="1.0.1"/>                    ─── 3B
      <sub-jnlp="http://www.ricoh.com/jsdk/ocr.jnlp>                 ─── 3C
  </resources>
  <update mode="mail">
4 {   <mail address="xxx@yyy.zzz.co.jp"/>
  </update>
  <install mode="auto">
5 {   <destination path="sdcard:/jsdk/0123"/>
  </install>
6 { <xlet-desc class="JSDKdemo"/ type="noGUI>
</jnlp>
```

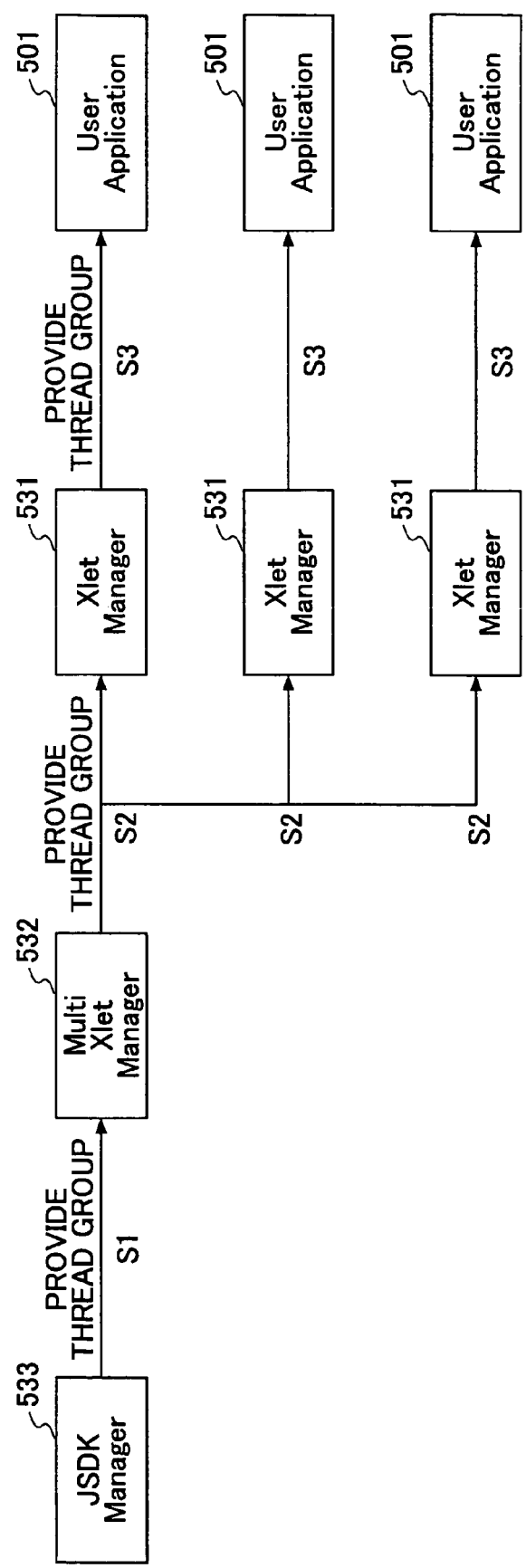

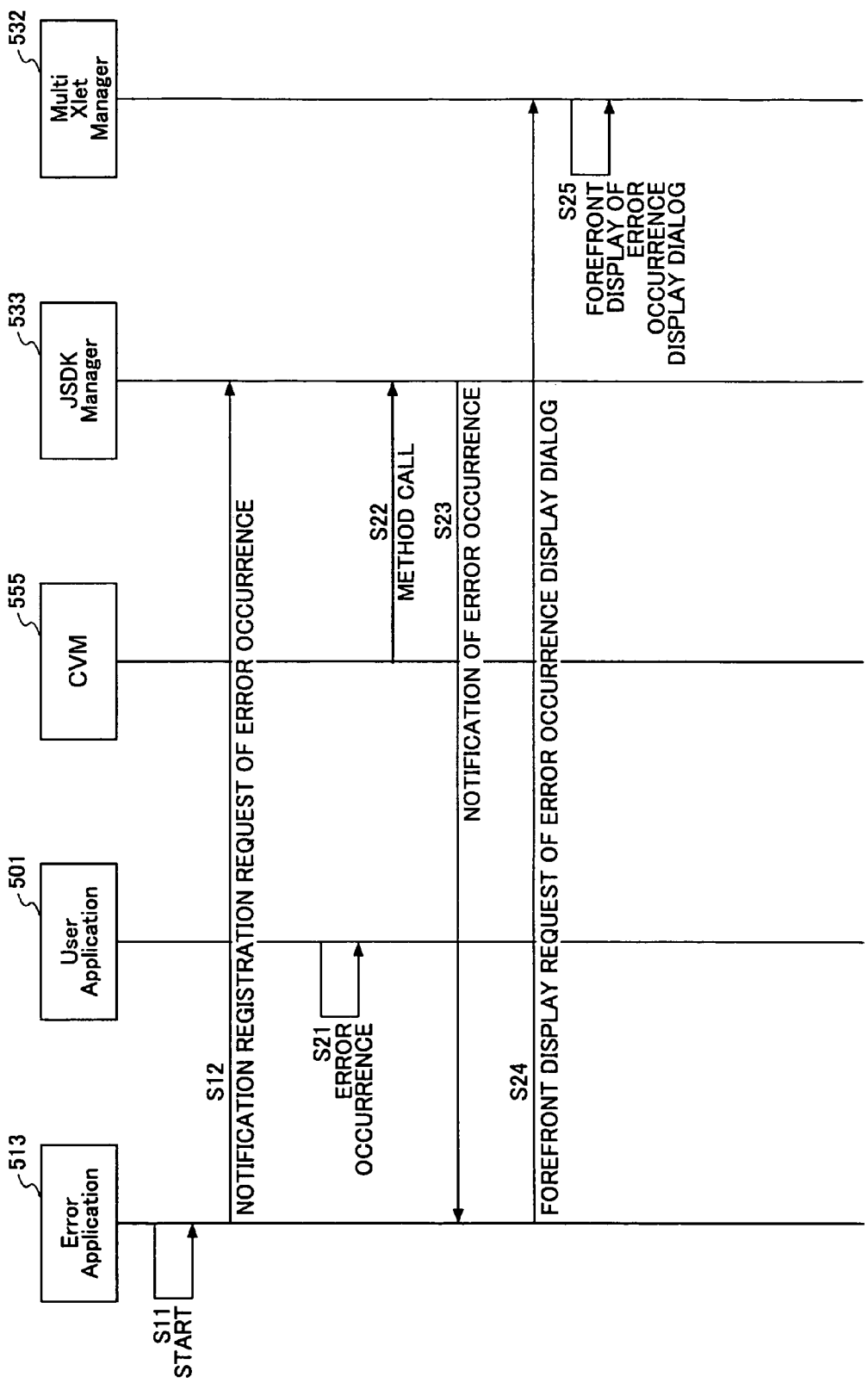

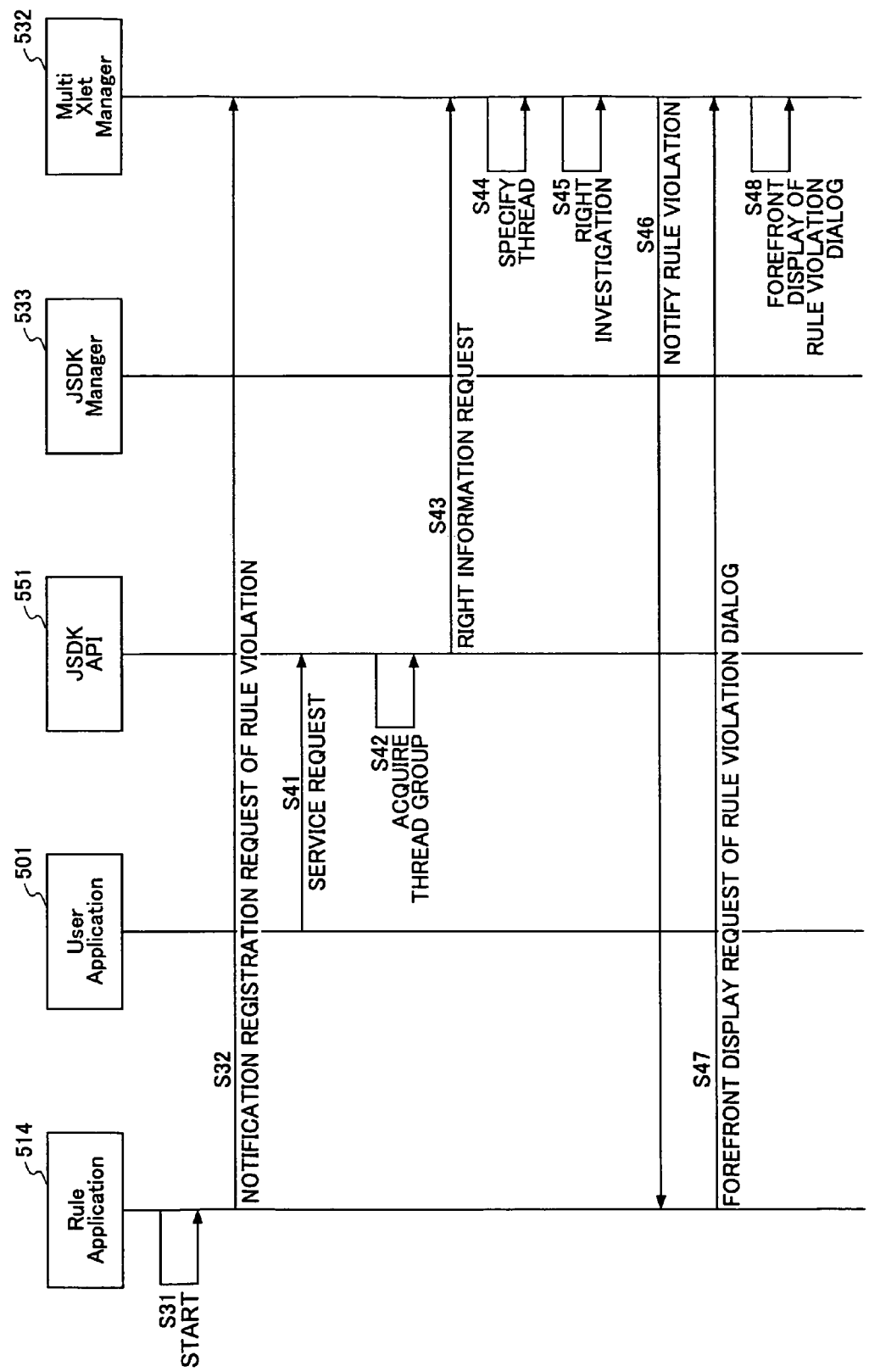

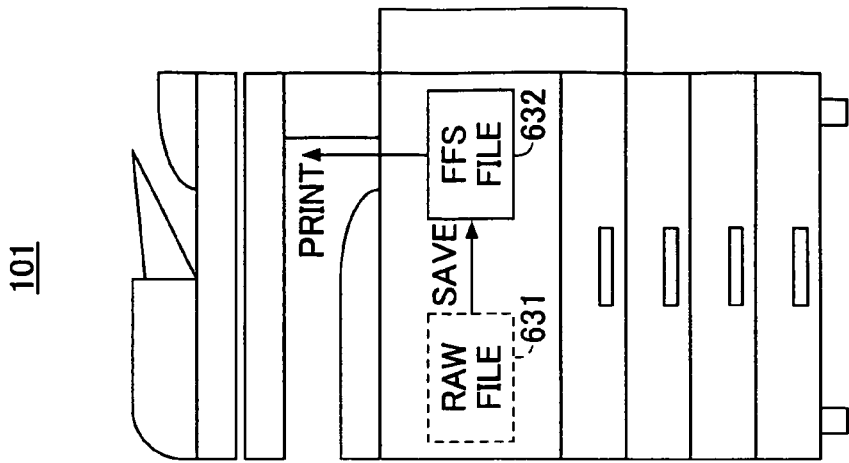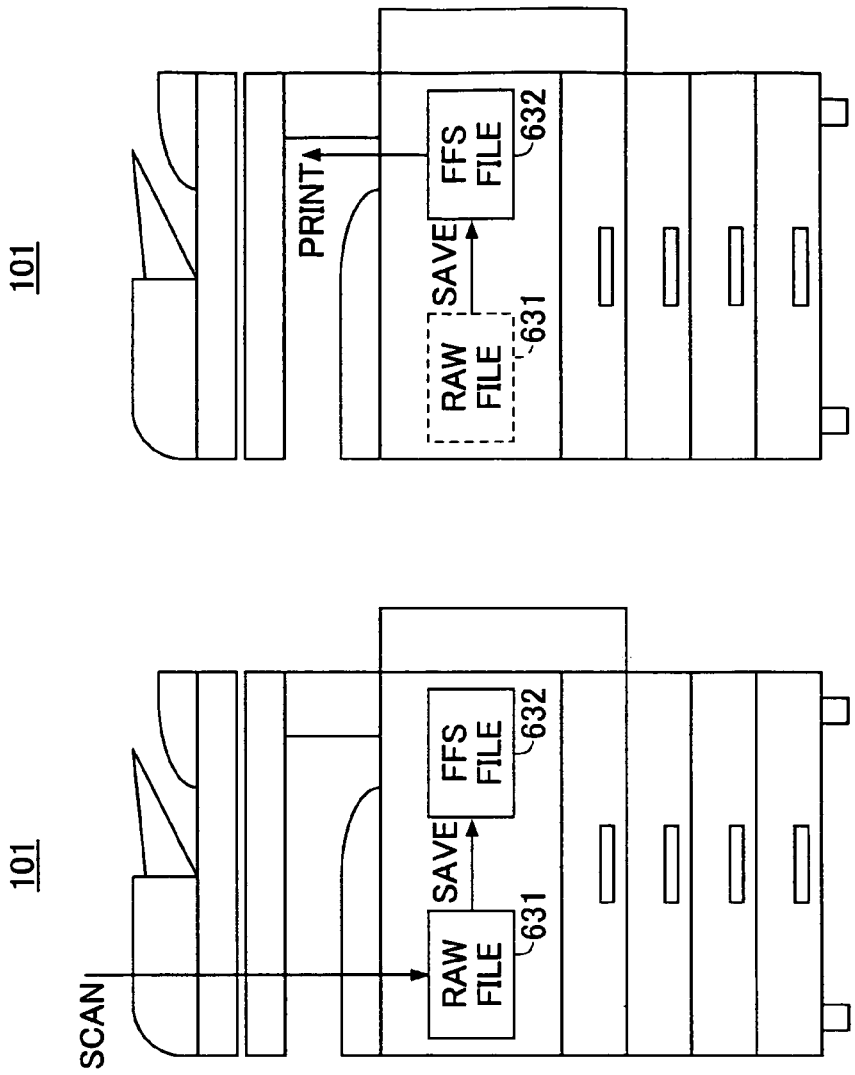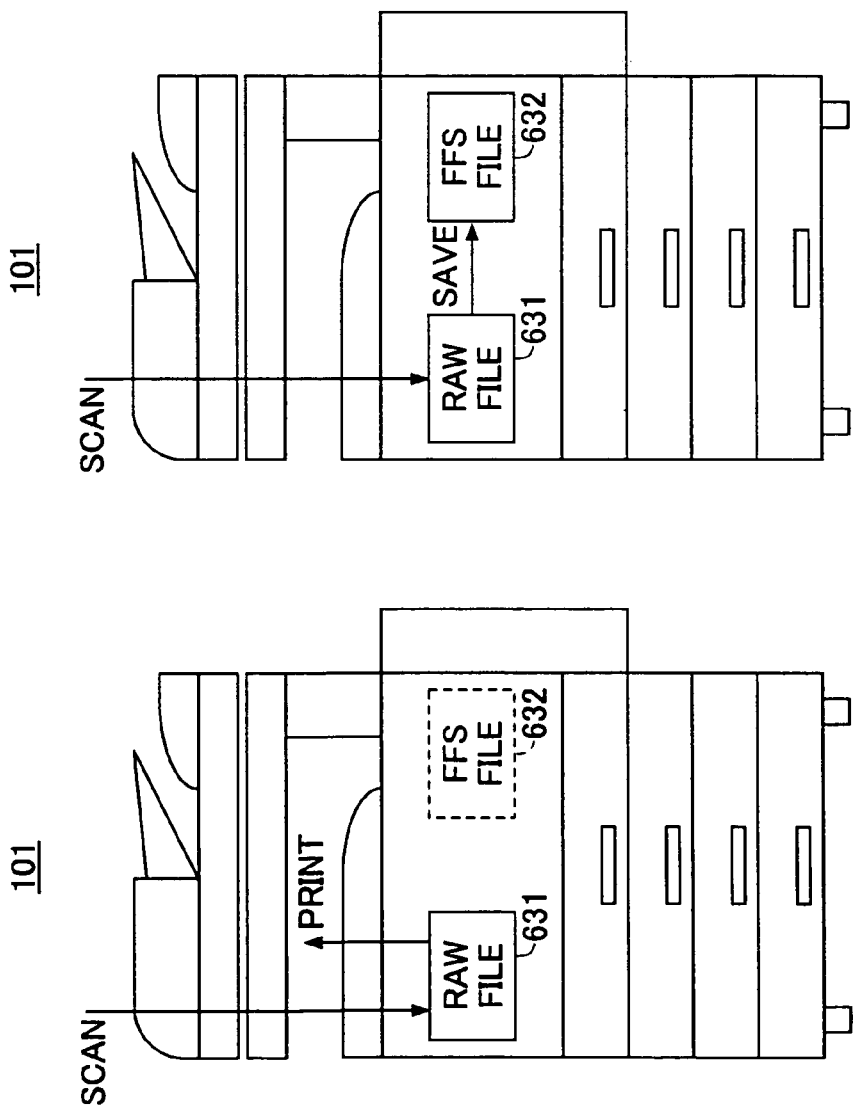

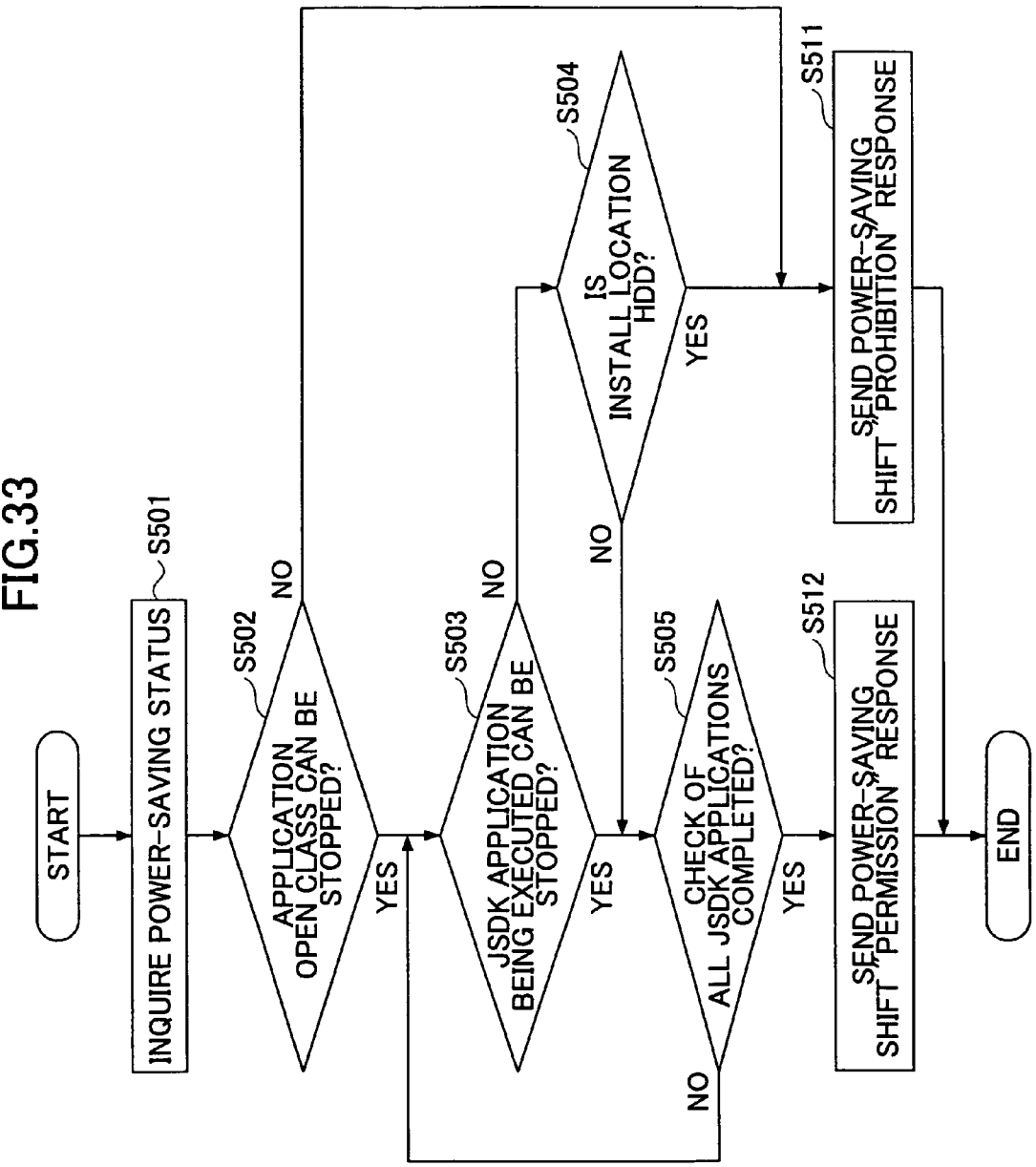

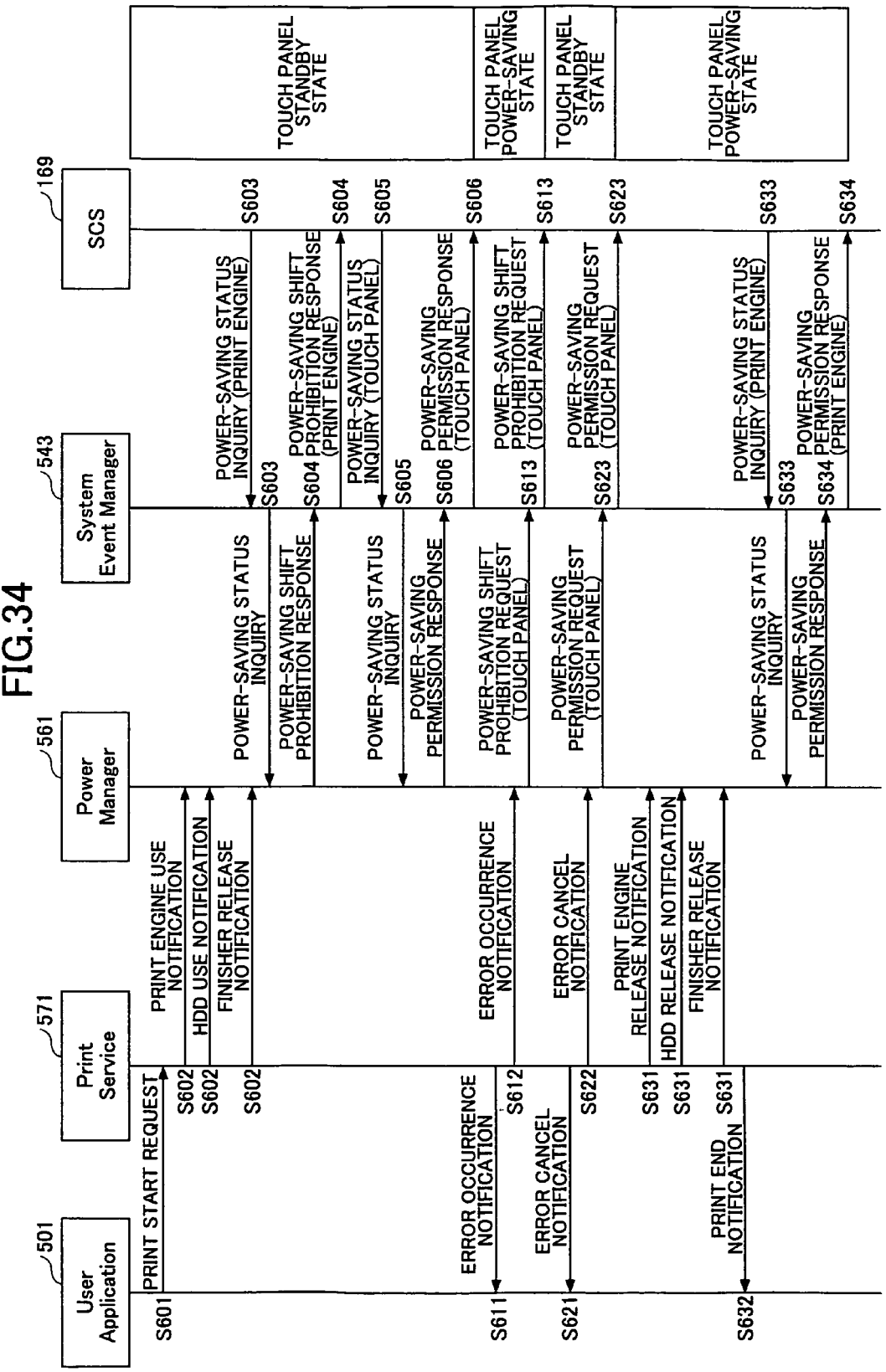

IMAGE PROCESSING APPARATUS, METHOD, PROGRAM, AND COMPUTER READABLE RECORDING MEDIUM FOR CONTROLLING OPERATION SWITCHING AND DISPLAYING AT OCCURRENCE OF ERROR CONDITIONS

BACKGROUND OF THE INVENTION

1. Field of the Invention

The present invention generally relates to image forming techniques and, more particularly, to an image forming apparatus, such as a copy machine, a printer, a scanner, a facsimile machine, a compound machine or a combination machine, a terminal apparatus such as a personal computer, an information processing method, an information processing program, and a recording medium such as an SD card or a CD-ROM storing programs for performing the information processing program.

2. Description of the Related Art

In recent years, a compound machine and a combination machine provided with functions as a copy machine, a printer, a scanner and a facsimile machine have been placed on the market. The compound machine and the combination machine have a hardware that serves as an image taking part, a printing part, a communication part, an operation and display part, etc., and are provided with four kinds of software associated with a copy machine, a printer, a scanner and a facsimile machine so that the compound machine and the combination machine function as a copy machine, a printer, a scanner or a facsimile machine by changing the software being used. When functioning as a copy machine or a printer, the compound machine and the combination machine form an image on a printing paper or the like. When functioning as a copy machine or a scanner, the compound machine and the combination machine read an image on an original document to be read. When functioning as a facsimile machine, the compound machine and the combination machine exchange image data with other remote equipments through a telephone line or the like. Japanese Laid-Open Patent Application No. 2002-84383 discloses such a compound machine or a combination machine.

As a mode of carrying out an application in the compound machine or the combination machine, although "one process for one application" in which a single application is executed on a single process is a main stream, "one process for a plurality applications", in which a plurality of applications are executed on one process, has been appearing. However, in a case where image processing of one process for a plurality of applications is performed in a system premising one process for one application, an application management system directed to one process for one application cannot manage each of the applications of one process for a plurality of applications, and it is required to provide an application management system directed to one process for a plurality of applications. As appreciated from the above-mentioned example, the compound machine and the combination machine require an application management system according to a mode for carrying out applications.

SUMMARY OF THE INVENTION

It is a general object of the present invention to provide an improved and useful image forming apparatus in which the above-mentioned problems area eliminated.

A more specific object of the present invention is to provide an image forming apparatus having a new application management system.

In order to achieve the above-mentioned objects, there is provided according to one aspect of the present invention an image forming apparatus comprising: a platform that manages applications; and an operation screen display application managed by the platform so as to display operation screens, objects to be operated by the operation screens being the applications managed by the platform.

According to the present invention, an application management system can be provided, which comprises a "platform" that manages life cycle of applications and an "operation screen display application" that displays operation screens of which objects to be operated are applications of which life cycles are managed by the platform. That is, the "platform" manages the lifecycles of the applications and the "operation screen display application" provides operation screens of which objects to be operated are applications of which life cycles are managed by the platform. Therefore, applications can be mounted easily. The operation screen display application itself is also an application of which life cycle is managed by the platform. Accordingly, the applications associated with operation screens can be easily mounted or exchanged. The same effects can be provided when a task bar display application, an error occurrence output application or a rule violation output application is provided as an application managed by the platform, as is in the invention mentioned below.

In the image forming apparatus according to the present invention, the operation screens may include a switching operation screen for switching between the applications that occupy a screen. The operation screens may include a starting operation screen for starting execution of one of the applications. The operation screens may include an ending operation screen for ending execution of one of the applications. The operation screens may include an installing operation screen for installing an application. The operation screens may include an uninstalling operation screen for uninstalling one of the applications.

According to another aspect of the present invention, there is provided an image forming apparatus comprising: a platform that manages applications; and a task bar display application managed by the platform so as to display task bars on a screen, objects to be operated by the task bars being the applications managed by the platform. In the above-mentioned image forming apparatus, the task bars may include a switching task bar for switching between the applications that occupy the screen.

Additionally, there is provided according to another aspect of the present invention an image forming apparatus comprising: a platform that manages applications; and an error occurrence output application managed by the platform so as to output information regarding an occurrence of an error when the error occurred in execution of one of the applications managed by the platform.

Further, there is provided according to another aspect of the present invention an image forming apparatus comprising: a platform that manages applications; and a rule violation output application managed by the platform so as to output information indicating an occurrence of a rule violation when the rule violation occurred in a process request for one of the applications managed by the platform.

In the image forming apparatus according to the above-mentioned invention, the platform may executes an automatic updating process of an execution file of one of the applications in accordance with contents of a management file that manages information regarding one of the applications on an individual application basis. The platform may include: individual management means for managing the applications on an individual application basis; lump management means for managing a plurality of the individual management means; and management means for managing the lump management means. The platform may manage a life cycle of one of the applications. The life cycle may include an initialized state, an active state, a stopped state and ended state of the one of the applications. The applications may be translated from source codes to byte codes by a compiler so that the applications are executed according to a virtual machine. Each of the applications may be executed as a thread. Each of the applications may be an Xlet. The applications and the platforms may be executed on the same process.

Additionally, there is provided according to another aspect of the present invention an image processing method performed in an image forming apparatus having a platform that manages applications; the image processing method comprising an operation screen display step of displaying an operation screen so that an object to be operated by the operation screen is one of the applications managed by the platform, a display of the operation screen being executed by one of the applications managed by the platform.

Additionally, there is provided according to another aspect of the present invention an image processing method performed in an image forming apparatus having a platform that manages applications, the image processing method comprising a task bar display step of displaying a task bar on a screen so that an object to be operated by the task bar is one of the applications managed by the platform, a display of the task bar being executed by one of the applications managed by the platform.

Further, there is provided according to another aspect of the present invention an image processing method performed in an image forming apparatus having a platform that manages applications, the image processing method comprising an error occurrence output step of outputting information regarding an occurrence of an error when the error occurred in execution of one of the applications managed by the platform, an output of the information being performed by one of the applications managed by the platform.

Additionally, there is provided according to another aspect of the present invention an image processing method performed in an image forming apparatus having a platform that manages applications, the image processing method comprising a rule violation output step of outputting information indicating an occurrence of a rule violation when the rule violation occurred in a process request for one of the applications managed by the platform, an output of the information being performed by one of the applications managed by the platform.

Additionally, there is provided according to another aspect of the present an image processing program causing an image processing apparatus to perform one of the above-mentioned image processing methods.

Further, there is provided according to another aspect of the present invention a computer readable recording medium storing one of the above-mentioned image processing programs.

Additionally, there is provided according to another aspect of the present invention a terminal apparatus serving as an emulator of an image forming apparatus, the terminal apparatus comprising: a platform that manages applications; and an operation screen display application managed by the platform of the terminal apparatus so as to display operation screens, objects to be operated by the operation screens being applications managed by the platform of the terminal apparatus or a platform of the image forming apparatus.

According to the above-mentioned invention, an application management system can be provided, which comprises a "platform" that is provided in a terminal apparatus or an image forming apparatus and manages life cycles of applications and an "operation screen display application" that displays operation screens of which objects to be operated are the applications of which life cycles are managed by the platform. That is, the "operation screen display application" provides operation screens of which objects to be operated are applications of which life cycles are managed by the platform of the terminal apparatus or the image forming apparatus. Therefore, applications can be mounted easily. The operation screen display application itself is also an application of which life cycle is managed by the platform of the terminal apparatus. Accordingly, the applications associated with operation screens can be easily mounted or exchanged. The same effects can be provided when a task bar display application, an error occurrence output application or a rule violation output application is provided as an application managed by the platform, as is in the invention mentioned below.

There is provided according to another aspect of the present invention a terminal apparatus serving as an emulator of an image forming apparatus, the terminal apparatus comprising: a platform that manages applications; and a task bar display application managed by the platform of the terminal apparatus so as to display task bars on a screen, objects to be operated by the task bars being the applications managed by the platform of the terminal apparatus or a platform of the image forming apparatus.

Additionally, there is provided according to another aspect of the present invention a terminal apparatus serving as an emulator of an image forming apparatus, the terminal apparatus comprising: a platform that manages applications; and an error occurrence output application managed by the platform of the terminal apparatus so as to output information regarding an occurrence of an error when the error occurred in execution of one of the applications managed by the platform of the terminal apparatus or a platform of the image forming apparatus.

Additionally, there is provided according to another aspect of the present invention a terminal apparatus serving as an emulator of an image forming apparatus, the terminal apparatus comprising: a platform that manages applications; and a rule violation output application managed by the platform of the terminal apparatus so as to output information indicating an occurrence of a rule violation when the rule violation occurred in a process request for one of the applications managed by the platform of the terminal apparatus or a platform of the image forming apparatus.

Additionally, there is provided according to another aspect of the present invention an image processing method performed in a terminal apparatus serving as an emulator of an image forming apparatus, the terminal apparatus having a platform that manages applications, the image processing method comprising an operation screen display step of displaying an operation screen so that an object to be operated by the operation screen is one of the applications managed by the platform or a platform of the image forming apparatus, a display of the operation screen being executed by one of the applications managed by the platform of the terminal apparatus.

Further, there is provided according to another aspect of the present invention an image processing method performed in a terminal apparatus serving as an emulator of an image forming apparatus, the terminal apparatus having a platform that manages applications, the image processing method comprising a task bar display step of displaying a task bar on a screen so that an object to be operated by the task bar is one of the applications managed by the platform of the terminal apparatus or a platform of the image forming apparatus, a display of the task bar being executed by one of the applications managed by the platform of the terminal apparatus.

Additionally, there is provided according to another aspect of the present invention an image processing method performed in a terminal apparatus serving as an emulator of an image forming apparatus, the terminal apparatus having a platform that manages applications, the image processing method comprising an error occurrence output step of outputting information regarding an occurrence of an error when the error occurred in execution of one of the applications managed by the platform of the terminal apparatus or a platform of the image forming apparatus, an output of the information being performed by one of the applications managed by the platform.

Additionally, there is provided according to another aspect of the present invention an image processing method performed in a terminal apparatus serving as an emulator of an image forming apparatus, the terminal apparatus having a platform that manages applications, the image processing method comprising a rule violation output step of outputting information indicating an occurrence of a rule violation when the rule violation occurred in a process request for one of the applications managed by the platform of the terminal apparatus of a platform of the image forming apparatus, an output of the information being performed by one of the applications managed by the platform of the terminal apparatus.

Additionally, there is provided according to another aspect of the present invention an image forming program causing a terminal apparatus to perform an image processing method performed in the terminal apparatus serving as an emulator of an image forming apparatus, the terminal apparatus having a platform that manages applications, the image processing method comprising an operation screen display step of displaying an operation screen so that an object to be operated by the operation screen is one of the applications managed by the platform or a platform of the image forming apparatus, a display of the operation screen being executed by one of the applications managed by the platform of the terminal apparatus.

Additionally, there is provided according to another aspect of the present invention an image forming program causing a terminal apparatus to perform an image processing method performed in the terminal apparatus serving as an emulator of an image forming apparatus, the terminal apparatus having a platform that manages applications, the image processing method comprising a task bar display step of displaying a task bar on a screen so that an object to be operated by the task bar is one of the applications managed by the platform of the terminal apparatus or a platform of the image forming apparatus, a display of the task bar being executed by one of the applications managed by the platform of the terminal apparatus.

Additionally, there is provided according to another aspect of the present invention an image forming program causing a terminal apparatus to perform an image processing method performed in the terminal apparatus serving as an emulator of an image forming apparatus, the terminal apparatus having a platform that manages applications, the image processing method comprising an error occurrence output step of outputting information regarding an occurrence of an error when the error occurred in execution of one of the applications managed by the platform of the terminal apparatus or a platform of the image forming apparatus, an output of the information being performed by one of the applications managed by the platform.

Additionally, there is provided according to another aspect of the present invention an image forming program causing a terminal apparatus to perform an image processing method performed in the terminal apparatus serving as an emulator of an image forming apparatus, the terminal apparatus having a platform that manages applications, the image processing method comprising a rule violation output step of outputting information indicating an occurrence of a rule violation when the rule violation occurred in a process request for one of the applications managed by the platform of the terminal apparatus of a platform of the image forming apparatus, an output of the information being performed by one of the applications managed by the platform of the terminal apparatus.

Further, there is provided according to another aspect of the present invention a computer readable recording medium storing an image forming program causing a terminal apparatus to perform an image processing method performed in the terminal apparatus serving as an emulator of an image forming apparatus, the terminal apparatus having a platform that manages applications, the image processing method comprising an operation screen display step of displaying an operation screen so that an object to be operated by the operation screen is one of the applications managed by the platform or a platform of the image forming apparatus, a display of the operation screen being executed by one of the applications managed by the platform of the terminal apparatus.

Additionally, there is provided according to another aspect of the present invention a computer readable recording medium storing an image forming program causing a terminal apparatus to perform an image processing method performed in the terminal apparatus serving as an emulator of an image forming apparatus, the terminal apparatus having a platform that manages applications, the image processing method comprising a task bar display step of displaying a task bar on a screen so that an object to be operated by the task bar is one of the applications managed by the platform of the terminal apparatus or a platform of the image forming apparatus, a display of the task bar being executed by one of the applications managed by the platform of the terminal apparatus.

Additionally, there is provided according to another aspect of the present invention a computer readable recording medium storing an image forming program causing a terminal apparatus to perform an image processing method performed in the terminal apparatus serving as an emulator of an image forming apparatus, the terminal apparatus having a platform that manages applications, the image processing method comprising an error occurrence output step of outputting information regarding an occurrence of an error when the error occurred in execution of one of the applications managed by the platform of the terminal apparatus or a platform of the image forming apparatus, an output of the information being performed by one of the applications managed by the platform.

Further, there is provided according to another aspect of the present invention a computer readable recording medium storing an image forming program causing a terminal apparatus to perform an image processing method performed in the terminal apparatus serving as an emulator of an image forming apparatus, the terminal apparatus having a platform that manages applications, the image processing method comprising a rule violation output step of outputting information indicating an occurrence of a rule violation when the rule violation occurred in a process request for one of the applications managed by the platform of the terminal apparatus of a platform of the image forming apparatus, an output of the information being performed by one of the applications managed by the platform of the terminal apparatus.

Additionally, there is provided according to another aspect of the present invention an image forming apparatus comprising: component devices that consume electric power; and control means for controlling whether to permit or prohibit the component devices to shift to a power-saving mode in accordance with an executing condition of an image forming process or an executing condition of an application for the image forming process.

In the image forming apparatus according to the above-mentioned invention, the control means may prohibit at least one of the component devices used in the image forming process from shifting to the power-saving mode when the image forming process is being executed. The control means may prohibit at least one of the component devices used in the image forming process from shifting to the power-saving mode when the application for the image forming process installed in a storage device of the image forming apparatus is being executed and execution of the application is not permitted to stop. The component devices may include a display device, and the control means may change a status of the shift to the power-saving mode of the display device from permission to prohibition when the image forming apparatus is set in the power-saving mode and when an error occurs in the image processing process. When there are first applications, which are being executed but not permitted to stop during the execution, among applications for the image forming process installed in a first storage device of the image forming apparatus, and when the first applications include a second application having a part, which is loaded to a second storage device during execution of the second application, the control means may prohibit the second storage device from shifting to the power-saving mode. The control means may change the status of the shift to the power-saving mode of the display device from prohibition to permission when the image forming apparatus is set in the power-saving mode and when the error occurring in the image processing process is cancelled.

Additionally, there is provided according to another aspect of the present invention an image forming apparatus comprising: component devices that consume electric power; and control means for controlling whether to permit or prohibit the component devices to shift to a power-saving mode in accordance with a control request made by an application for an image forming process.

In the image forming apparatus according to the above-mentioned invention, the control means may permit, as a default, the shift to the power-saving mode with respect to the component devices to which no control request is made by the application for the image forming process.

In the image forming apparatus according to the above-mentioned invention, the application may be translated from source codes to byte codes by a compiler, and the application is executed by a virtual machine. The application may be an Xlet.

Additionally, there is provided according to another aspect of the present invention an image processing method performed by an image forming apparatus having component devices that consume electric power, the image processing method comprising a control step of controlling whether to permit or prohibit the component devices to shift to a power-saving mode in accordance with an executing condition of an image forming process or an executing condition of an application for the image forming process.

In the image processing method according to the above-mentioned invention, the control step may prohibit at least one of the component devices used in the image forming process from shifting to the power-saving mode when the image forming process is being executed. The control step may prohibit at least one of the component devices used in the image forming process from shifting to the power-saving mode when the application for the image forming process installed in a storage device of the image forming apparatus is being executed and execution of the application is not permitted to stop. The component devices may include a display device, and the control step may change a status of the shift to the power-saving mode of the display device from permission to prohibition when the image forming apparatus is set in the power-saving mode and when an error occurs in the image processing process. When there are first applications, which are being executed but not permitted to stop during the execution, among applications for the image forming process installed in a first storage device of the image forming apparatus, and when the first applications include a second application having a part, which is loaded to a second storage device during execution of the second application, the control step may prohibit the second storage device from shifting to the power-saving mode. The control step may change the status of the shift to the power-saving mode of the display device from prohibition to permission when the image forming apparatus is set in the power-saving mode and when the error occurring in the image processing process is cancelled.

Additionally, there is provided according to anther aspect of the present invention an image processing method performed by an image forming apparatus having component devices that consume electric power, the image processing method comprising a control step of controlling whether to permit or prohibit the component devices to shift to a power-saving mode in accordance with a control request made by an application for an image forming process.

In the image processing method according to the above-mentioned invention, the control step may permit, as a default, the shift to the power-saving mode with respect to the component devices to which no control request is made by the application for the image forming process.

In the image processing method according to the above-mentioned invention, the application may be translated from source codes to byte codes by a compiler, and the application is executed by a virtual machine. The application maybe an Xlet.

Additionally, there is provided according to another aspect of the present invention an image processing program causing an image forming apparatus to perform any one of the above-mentioned image processing methods.

Further, there is provided according to another aspect of the present invention a computer readable recording medium storing the above-mentioned image processing program.

Other objects, features and advantages of the present invention will become more apparent from the following detailed description when read in conjunction with the accompanying drawings.

BRIEF DESCRIPTION OF THE DRAWINGS

FIG. 7A is an illustration of a switching operation screen for performing a switching operation of a user application occupies the screen;

FIG. 7B is an illustration of a starting operation screen for performing a starting operation of the user application;

FIG. 7C is an illustration of an ending operation screen for performing an ending operation of the user application;

FIG. 7D is an illustration of an installing operation screen for performing an installing operation of the user application;

FIG. 7E is an illustration of an uninstalling operation screen for performing an uninstalling operation of the user application;

FIG. 17 illustrates an example of syntax of a JNLP file;

FIG. 22 is a block diagram for explaining a setting process of a thread group;

FIG. 23 is a sequence chart of an error occurrence display process;

FIG. 25 is a sequence chart of a rule violation display process;

FIG. 26A is an illustration for explaining a printing process of a scan image;

FIG. 26B is an illustration for explaining a saving process of a scan image;

FIG. 26C is an illustration for explaining a printing process of a saved image;

FIG. 33 is a flowchart of a third example of the power control of the combination machine; and FIG. 34 is a flowchart of a fourth example of the power control of the combination machine.

DETAILED DESCRIPTION OF THE PREFERRED EMBODIMENTS

Figure 1:
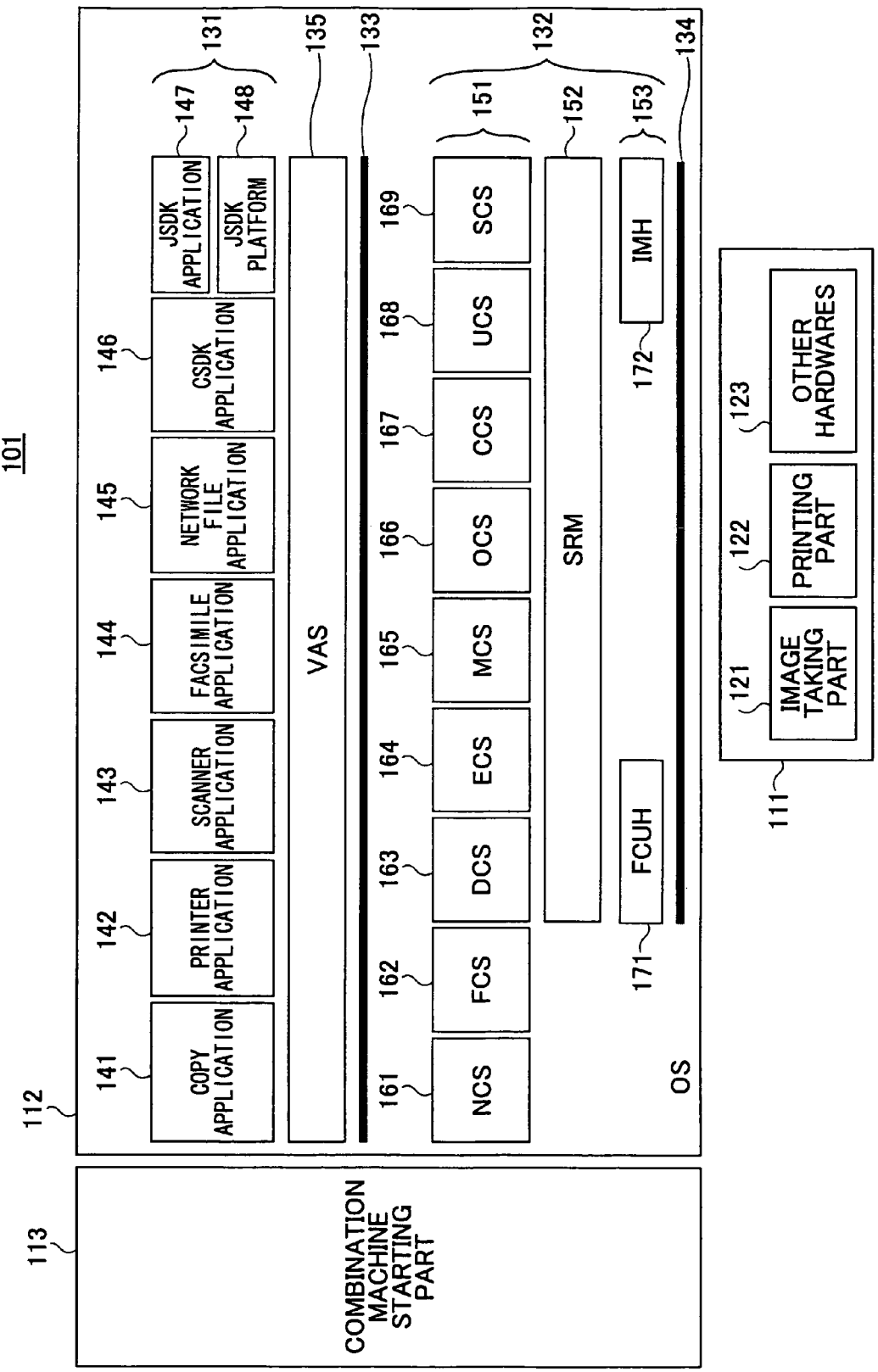
FIG. 1 is a block diagram of a combination machine according to a first embodiment of the present invention.

A description will now be given of a first embodiment of the present invention. FIG. 1 is a block diagram of a combination machine 101 according to a first embodiment of the present invention. The combination machine 101 shown in FIG. 1 comprises a hardware part 111, a software part 112 and a combination machine starting part 113.

The hardware 111 of the combination machine 101 includes an image taking part 121, a printing part 122 and other hardware parts 123. The image taking part 121 is a hardware part for reading an image (image data) of an original document to be read. The printing part 122 is a hardware part for printing an image (image data) on a printing paper. In the software part 112 of the combination machine 101, there are an application 131, which includes various kinds of applications, and a platform 132, which includes various kinds of platforms. These programs are executed in parallel on an individual process basis by an operating system (OS) such as UNIX (Registered Trademark).

As the application 131, there are provided a copy application 141 which is an application used for copying, a printer application 142 which is an application used for a printer, a scanner application 143 which is an application for a scanner, a facsimile application 144 which is an application used for a facsimile machine, and a network file application 145 which is an application used for a network file. The application 131 can be developed using a software development kit (SDK) for exclusive use. The application 131 developed using the SDK is referred to as an SDK application.

As for the SDK for exclusive use, there are provided "CSDK", which is used for developing the application 131 according to C language and "JSDK", which is used for developing the applications according to Java (registered trademark). Each application 131 developed using the CSDK is referred to a CSDK application, and each application 131 developed using the JSDK is referred to as a JSDK application. The application 131 of the combination machine 101 of FIG. 1 include a CSDK application 146 and a JSDK application 147 as well. The combination machine 101 of FIG. 1 further includes a JSDK plat form as software for mediating between the JSDk application 147 described in the Java (registered trademark) language and another software described in the C language. As the platform 132, there are provided control service 151 including various kinds of control service, a system resource manager 152 and a handler 153.

As the control service 151, there are provided a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. As the handlers 153, there are provided a facsimile control unit handler (FCUH) 171 and an image memory handler (IMH) 172.

The process of NCS 161 mediates network communication. The process of FCS 162 provides API of a facsimile. The process of DCS 163 performs a control with respect to distribution processing of accumulated documents. The process of ECS 164 performs a control of the image taking part 121 and a printing part 122. The process of MCS 165 performs a control with respect to memories and a hard disk drive. The process of OCS 166 performs a control with respect to the operation panel. The process of CCS 167 performs a control with respect to an authentication process or a fee-charging process. The process of UCS 168 performs a control with respect to management of user information. The process of SCS 169 performs a control with respect to management of the system.

There is provided a virtual application service (VAS) 135 as software mediating between the application 131 and the platform 132. The VAS 135 operates as a server process, which sets the application 131 as a client, and also serves as a client process, which sets the platform 132 as a server. The VAS 135 is provided with a wrapping function to mask the platform 132 when viewing from the application 131 so as to play a role to absorb a version difference associated with upgrade of a version.

The combination machine starting part 113 is first operated after a power is supplied to the combination machine 101. Thereby, the OS such as UNIX (registered trademark) is booted, and the application 131 and the platform 132 are started. These programs are accumulated in a hard disk drive or a memory card so that the programs are stored in a memory after retrieved from the hard disk drive or the memory card.

Figure 2:
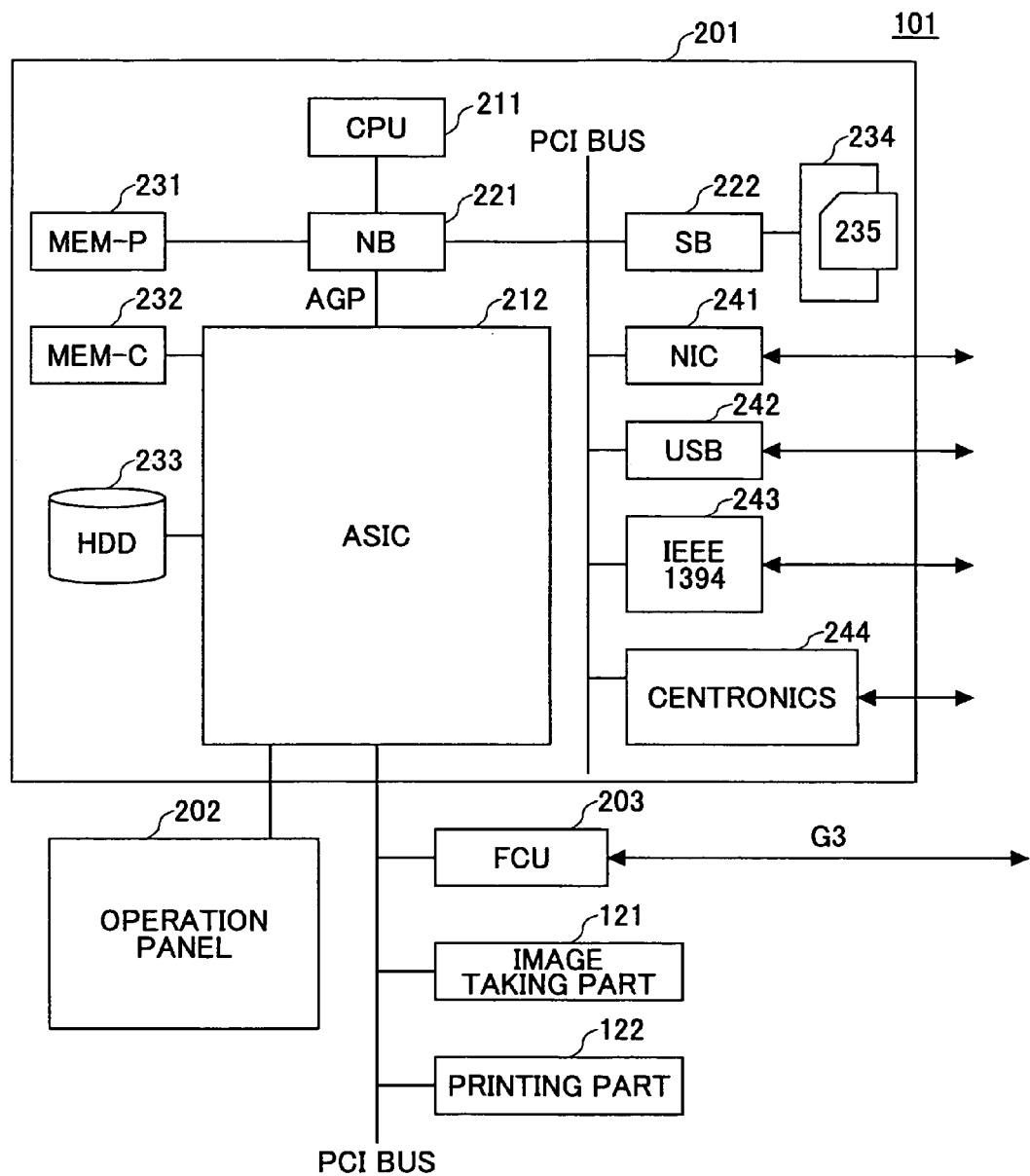
FIG. 2 is a hardware block diagram of the combination machine of FIG. 1.

FIG. 2 is a hardware block diagram of the combination machine 101 of FIG. 1. As the hardware part 111 of the combination machine 101, there are a controller 201, an operation panel 202, a facsimile control unit (FCU) 203, the image taking part 121 and the printing part 122.

The controller 201 comprises a central processing unit (CPU) 211, an application specification integrated circuit (ASIC) 212, a North bridge (NB) 221, a South bridge (SB) 222, a memory for printer (MEM-P) 231, a memory for computer (MEM-C) 232, a hard disk drive (HDD) 233, a memory card slot 234, a network interface controller (NIC) 241, a USB device 242, an IEEE1394 device 243, and a Centronics device 244.

The CPU 211 is an integrated circuit (IC) for various information processing. The ASIC 212 is an IC for various picture processing. The NB 221 is a North bridge of the controller 201. The SB 222 is a South bridge of the controller 201. The MEM-P 231 is a system memory of the combination machine 101. The MEM-C 232 is a local memory of the combination machine 101. The HDD 233 is a storage of the combination machine 101. The memory card slot 234 is a slot for loading a memory card 235. The NIC 241 is a controller for network communication according to a media access control (MAC) address. The USB device 242 is a device for providing a connection terminal according to the USB specification. The IEEE1394 device 243 is a device for providing a connection terminal according to the IEEE1394 specification. The Centronics device 244 is a device for providing a connection terminal according to the Centronics specification.

The operation panel 202 is a hardware (operation part) for an operator to input instructions or data to the combination machine 101, and also a hardware (display part) for acquiring an output from the combination machine 101.

Figure 3:
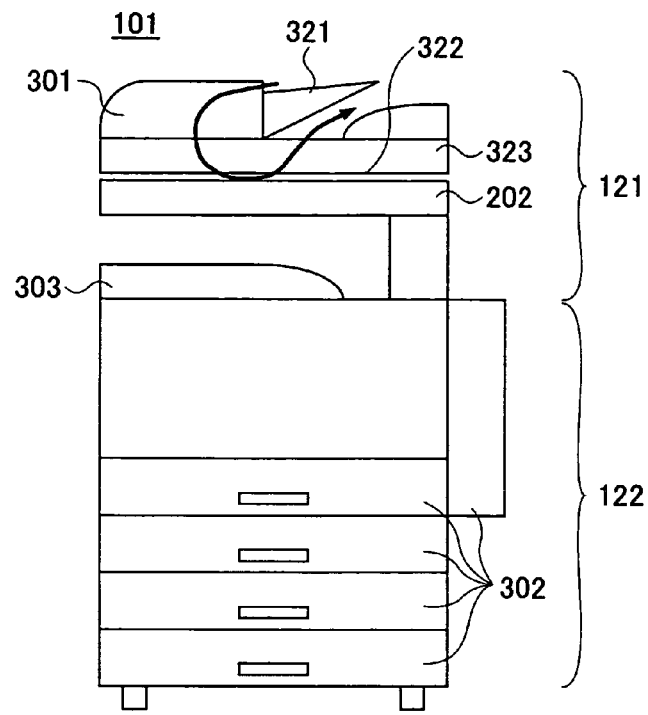
FIG. 3 is a front view of the combination machine of FIG. 1.

FIG. 3 is a front view of the combination machine 101 of FIG. 1. In FIG. 3, the locations of the image taking part 121, the printing part 122 and the location of the operation panel 202. FIG. 3 also illustrates an original-document setting part 301 onto which an original document is set, a paper-supply part 302 to which printing papers are supplied, and a paper-eject part 303 onto which the printing papers are ejected.

Figure 4:
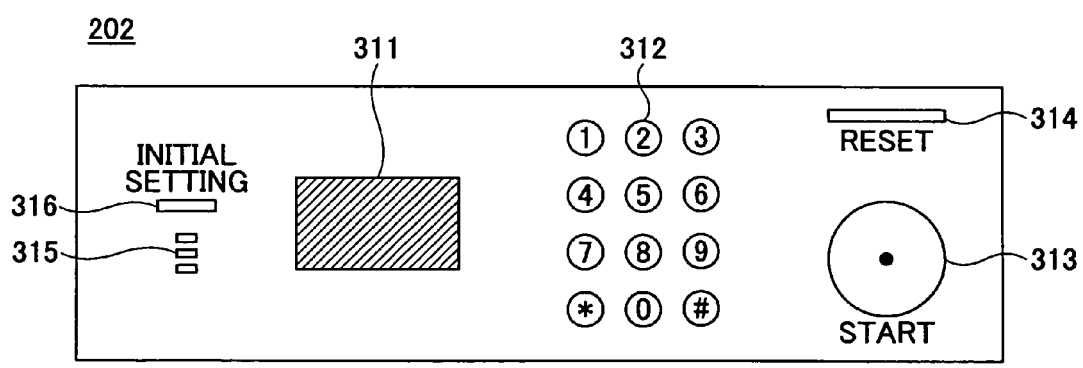
FIG. 4 is an illustration of an operation panel.

The operation panel 202 comprises, as shown in FIG. 4, a touch panel 311, a ten key 312, a start button 313, a reset button 314, a function key 315 and a initial-setting button 316. The touch panel 311 is a hardware (touch operation part) for inputting by a touch operation, and also a hardware (screen display part) for obtaining an output through a screen display. The ten key 312 is a hardware for performing a figure input by operation of keys (buttons). The start button 313 is a hardware for performing a start operation by a button operation. The reset button 314 is a hardware for performing a reset operation by a button operation. The function key 315 is a hardware for causing an operation screen to be displayed by the CSDK application 146 or the JSDK application 147 by a key (button) operation. The initial-setting button 316 is a hardware for displaying an initial-setting screen by a button operation. The original-document set part 301 comprises an automatic document feeder (ADF) 321, a flat bed 322 and a flat bed cover 323. The paper-supply part 302 is comprises four paper feed trays. The paper-eject part 303 comprises one paper-eject tray.

(JSDK)

Figure 5:
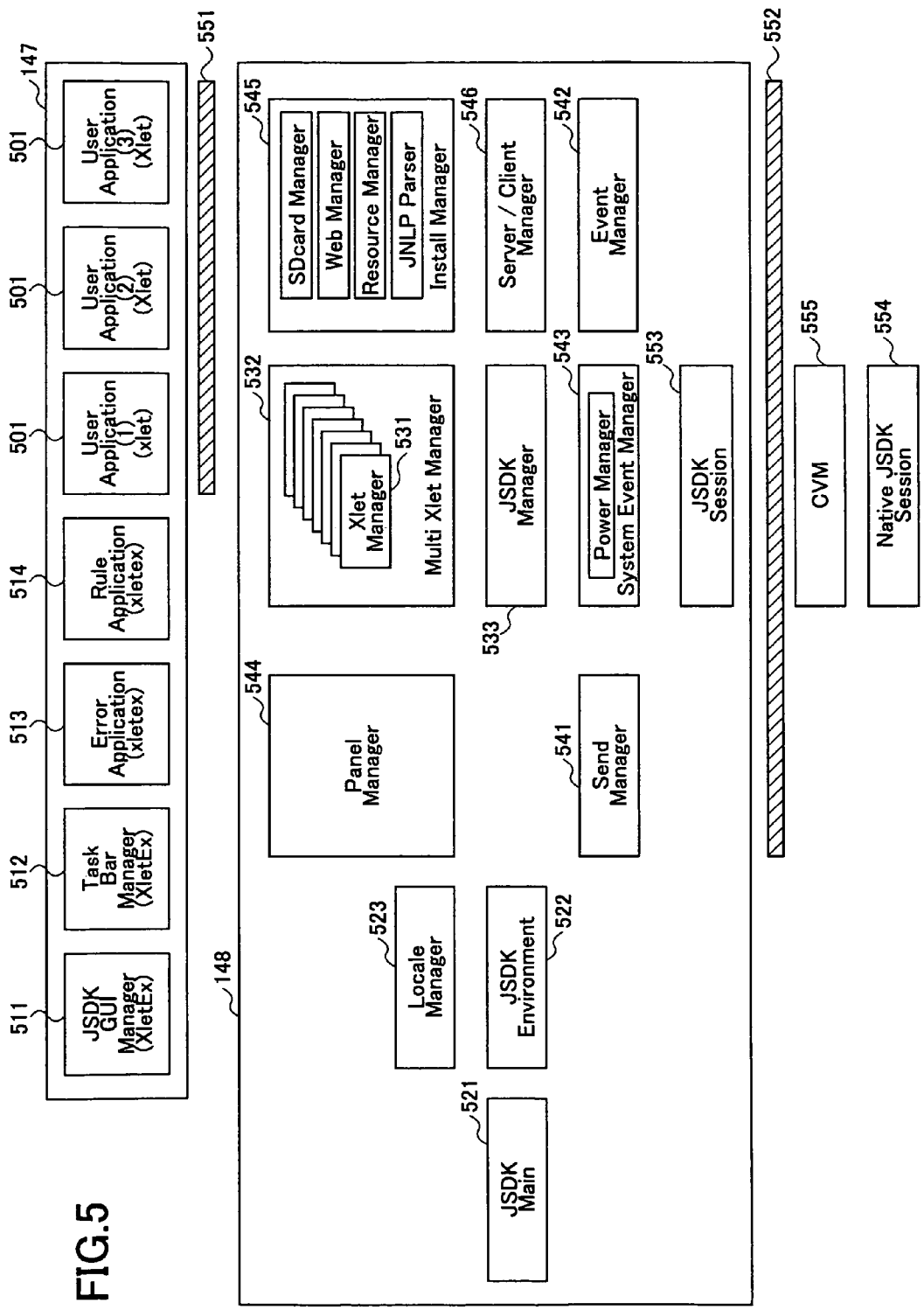
FIG. 5 is a class diagram of a JSDK application and a JSDK platform shown in FIG. 1.

FIG. 5 is a class diagram of the JSDK application 147 and the JSDK platform 148 shown in FIG. 1. The JSDK application 147 and the JSDK platform 148 are executed on the same process as a single process as a whole. Each block in the JSDK application 147 and the JSDK platform 148 is executed on an individual thread unit basis as a thread on the process (multi thread). The JSDK an application 147 and the JSDK platform 148 are translated from source codes to bit codes by a Java (Registered Trademark) compiler in a lump, and are sequentially executed by a Java (Registered Trademark) virtual machine. The JSDK an application 147 and the JSDK platform 148 are mounted according the personal basic profile of the Java (Registered Trademark) 2 Micro Edition.

As the JSDK application 147, there are user applications 501, a JSDK GUI Manager 511, a task bar manager 512, an error application 513 and a rule application 514. The user applications 501 are JSDK applications which a user of the combination machine 101 (for example, a vender) developed using the JSDK. The JSDK GUI manager 511 is a JSDK application which performs a display of an operation screen directed to other JSDK applications (the user applications 501, etc.) as objects to be operated. The JSDK task bar manager 512 is a JSDK application which performs a display of a task bar for other JSDK applications (the user applications 501, etc.) as objects to be operated. The error application 513 is a JSDK application which displays or sends a notification of a fact that an error has occurred in other JSDK applications (the user applications 501, etc.). The rule application 514 is a JSDK application which displays or sends a notification of a fact that there has been a rule violation in a process request in other JSDK applications (the user applications 501, etc.).

Here, the user application 501 is an Xlet, which is a Java (Registered Trademark) application line up with a standalone application or an applet. Here, each of the JSDK GUI manager 511, the task bar manager 512, the error application 513 and the rule application 514 is an Xlet (XletEx) which is given an original extension. In the JSDK platform 148, there are classes such as JSDK main 521, JSDK environment 522, a locale manager 523, Xlet managers 531, a multi Xlet manager 532, a JSDK manager 533, a send manager 541, an event manager 542, a system event manager 543, a panel manager 544, an install manager 545, and a server/client manager 546, etc. The JSDK main 521 is a class which performs a starting of a JSDK system. The JSDK environment 522 is a class which performs a starting environment setup of the JSDK system. The locale manager 523 is a class which performs internationalization correspondence (language designation).

The Xlet managers 531 is a class which manages Xlet on one to one basis. Here, information regarding a state of seven Xlets and their life cycles are managed on one to one basis. The information regarding the state of Xlets is managed by the Xlet managers 531, and is announced from the Xlet Managers 531 to the XletEx, and, then, is used for a display process or notification process by XletEx. The multi Xlet manager 532 is a class which manages all of the Xlet managers 531. Here, the life cycles of all of the seven Xlet Managers 531 are managed by the Multi Xlet Manager 532. The JSDK manager 533 is a class which manages the whole JSDK system. For example, the life cycles of the multi Xlet manager 532, the send manager 541, the event manager 542, the system event manager 543, the panel manager 544, the install manager 545 and the server/client manager 546 are managed by the JSDK manager 533.

The system event manager 543 is a class which manages the system events (electric-power mode, etc.) from the platform 132 of FIG. 1. The panel manager 544 is a class which performs mediation at the time of one Xlet occupying the screen of the operation panel 202. The install manager 545 is a class which performs management of installation or uninstallation from the SD card or Web.

In the JSDK system of FIG. 5, the JSDK API 551 and the JSDK API 552 are used as API. It should be noted that there is a difference between the Xlet and Xlet Ex in that the JSDK API 551 is used for accessing an object and the JSDK platform 148 is accessible the combination machine 101 of FIG. 1 further comprises, as an element associated with the JSDK system of FIG. 5, a JSDK session 553 and a native JSDK session 554 which serve as an interface between the C language and the Java (Registered Trademark) language, and also comprises a Java virtual machine for executing the JSDK application.

Figure 6:
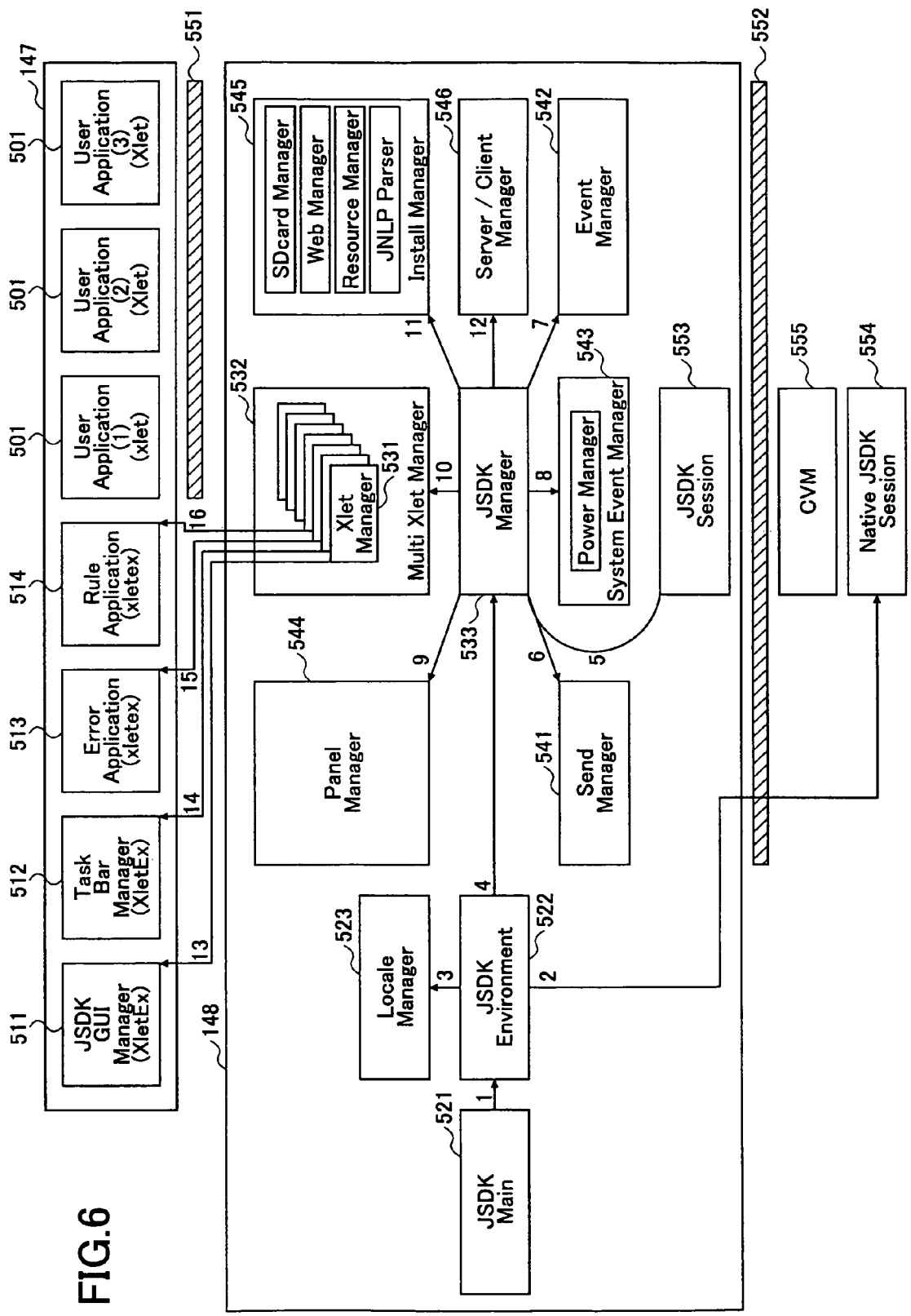
FIG. 6 is a diagram for explaining a start procedure of a JSDK system.

FIG. 6 is a diagram for explaining a start procedure of the JSDK system. In the JSDK system, the JSDK main 521, which is a class having a main function that starts the JSDK application 147, generates the JSK environment 522 (step S1). Then, the JSDK environment 522 constructs a native layer (step S2) and a language environment (step S3) to construct a practical environment of the JSDK system. Thereafter, the JSDK environment 522 produces the JSDK manager 533 (step S4). Then, in the JSDK system, the JSDK manager 533 produces a manager on the system layer (step S5-12), and produces a manager of the application layer through the multi Xlet manager 532 and the Xlet manager 531 (steps S13-16).

FIG. 7A through 7E are illustrations of screens according to the graphical user interface (GUI) of the JSDK system. When the function key 315 (refer to FIG. 4) of the combination machine 101 is pushed, the process of steps S1 through S16 of FIG. 6 is performed, the GUI screens shown in FIGS. 7A through 7E are displayed on the touch panel 311 (refer to FIG. 4) of the combination machine 101. The GUI screens of FIGS. 7A through 7E are operation screens of which object of operation is the user application 501, and are displayed by the JSDK GUI manager 511 started in step S13 of FIG. 6.

FIG. 7A is an illustration of a switching operation screen for performing a switching operation of the user application 501 which occupies the screen. FIG. 7B is an illustration of a starting operation screen for performing a starting operation of the user application 501. FIG. 7C is an illustration of an ending operation screen for performing an ending operation of the user application 501. FIG. 7D is an illustration of an installing operation screen for performing an installing operation of the user application 501. FIG. 7E is an illustration of an uninstalling operation screen for performing an uninstalling operation of the user application 501. FIG. 7A shows an initial screen displayed on the touch panel 311 immediately after pushing the function key 315. The screens of FIGS. 7B, 7C, 7D and 7E are displayed on the touch panel 311 when switching, starting, ending, installing and uninstalling the application 501, respectively.

In each figure, SimplePrint, SimpleCopy,

SimpleOcr and SimpleScan are designations of the user applications 501. For example, SimplePrint is an application for enabling printing of an electronic document by inputting a file name of the electronic document. It should be noted that the type of application indicates whether it is an application having the GUI function.

A description will now be given of the switching operation of FIG. 7A. A list of the user applications 501, that have been installed and being executed as objects to be switched, is displayed on the switching operation screen of FIG. 7A.

Figure 8A:
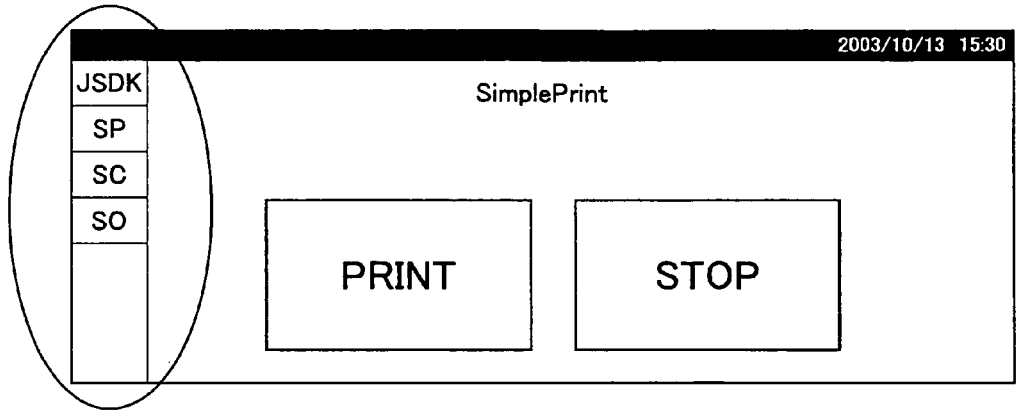
FIG. 8A is an illustration of a GUI screen displayed by SimplePrint.

When "SimplePrint" is touched on the switching operation screen of FIG. 7A, a right of owner of the operation panel 202 is given to SimplePrint, and SimplePrint occupies the screen. In association with this, the display is changed from the screen of FIG. 7A to a screen of FIG. 8A. FIG. 8A is an illustration of the GUI screen displayed by SimplePrint, which occupies the screen.

When "SimpleCopy" is touched on the switching operation screen of FIG. 7A, a right of owner of the operation panel 202 is given to SimpleCopy, and SimpleCopy occupies the screen. In association with this, the display is changed from the screen of FIG. 7A to a screen of FIG. 8B. Since the status of SimpleCopy is "abnormal" as shown in FIG. 7A, an error message relating to SimpleCopy is displayed on the screen as shown in FIG. 8B.

When "SimpleOcr" is touched on the switching operation screen of FIG. 7A, a right of owner of the operation panel 202 is given to SimpleOcr, and SimpleOcr occupies the screen. In association with this, the display is changed from the screen of FIG. 7A to a screen of FIG. 8C. Since the type of SimpleOcr is "without GUI" as shown in FIG. 7A, the state of SimpleOcr is displayed on the screen as shown in FIG. 8C.

Figure 8B:
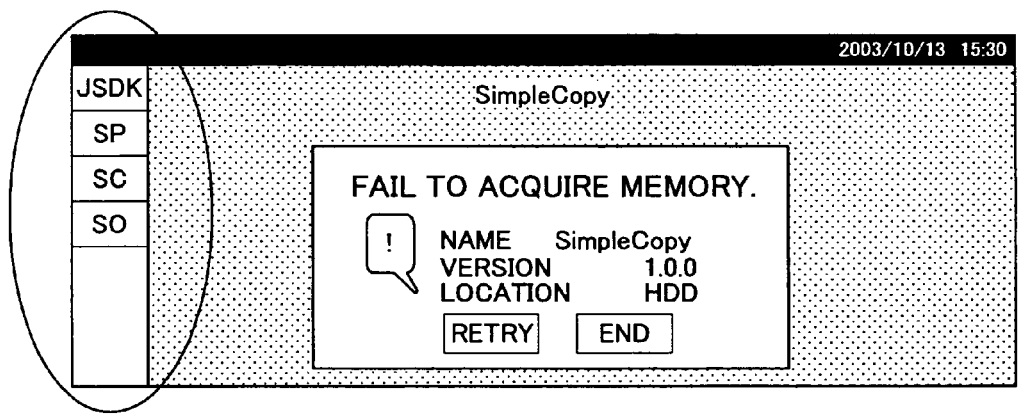
FIG. 8B is an illustration of an error message screen relating to SimpleCopy.
Figure 8C:
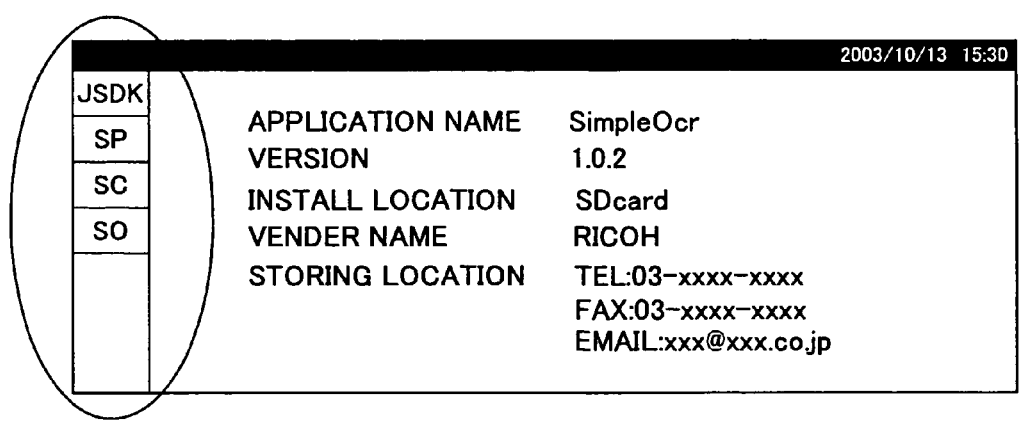
FIG. 8C is an illustration of a screen indicating a state of SimpleOcr.

A task bar of which object is the user application 501 is displayed on the left end side (encircled by an ellipse) of the screens of FIGS. 8A, 8B and 8C by the task bar manager 512 started in the process of step S14 in FIG. 6. The task bars are switching task bars for performing a switching operation of the user application which is caused to occupy the screen.

When "SC" or "SO" in the switching task bar is touched on the screen of FIG. 8A, a right of owner of the operation panel 202 is given to SimpleCopy or SimpleOcr, and SimpleCopy or Simpleocr occupies a screen. In association with this, the display is changed from the screen of FIG. 8A to the screen of FIG. 8B or 8C. If "JSDK" in the switching task bar is touched on the screen of FIG. 8A, the display returns to the screen of FIG. 7A.

When "SP" or "SO" in the switching task bar is touched on the screen of FIG. 8B, a right of owner of the operation panel 202 is given to SimplePrint or SimpleOcr, and SimplePrint or SimpleOcr occupies the screen. In association with this, the display is changed from the screen of FIG. 8B to the screen of FIG. 8A or 8C. If "JSDK" in the switching task bar is touched on the screen of FIG. 8B, the display returns to the screen of FIG. 7A.

When "SP" or "C" in the switching task bar is touched on the screen of FIG. 8C, a right of owner of the operation panel 202 is given to SimplePrint or SimpleCopy, and SimplePrint or SimpleCopy occupies a screen. In association with this, the display is changed from the screen of FIG. 8C to the screen of FIG. 8A or 8B. If "JSDK" in the switching task bar is touched on the screen of FIG. 8c, the display returns to the screen of FIG. 7A.

Figure 9:
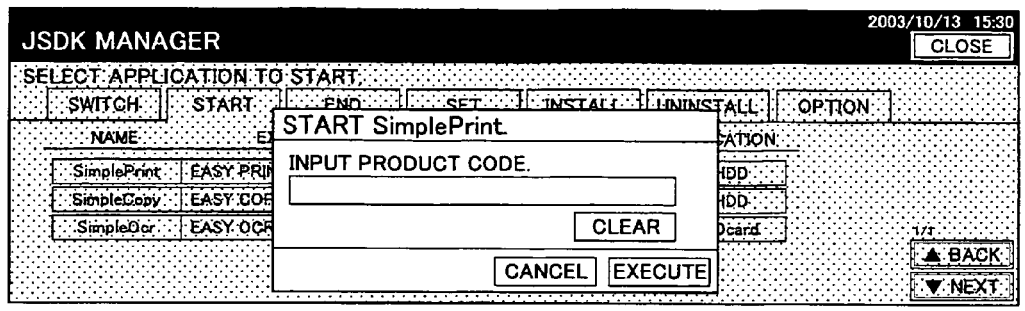
FIG. 9 is an illustration of a check screen for checking whether to execute a starting process of SimplePrint.

A description will now be given of the starting operation screen of FIG. 7B. A list of the user applications 501, that have been installed but not being executed as objects to be switched, is displayed on the starting operation screen of FIG. 7B. If "SimplePrint"" is touched on the starting operation screen of FIG. 7B, a check screen (FIG. 9) which is for checking whether to execute a starting process of SimplePrint is displayed. SimplePrint will be started, when a product cord is input on the check screen of FIG. 9 and "execution" is touched.

Figure 10:
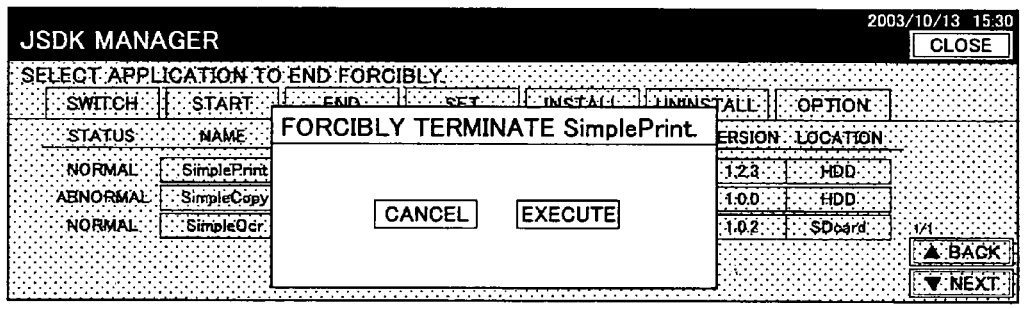
FIG. 10 is an illustration of a check screen for checking whether to execute a forced-termination process of SimplePrint.

A description will be given of the ending operation screen of FIG. 7C. A list of the user applications 501, that have been installed and being executed as objects of which operation is to be ended, is displayed on the ending operation screen of FIG. 7C. If "SimplePrint" is touched on the ending operation screen of FIG. 7C, a check screen (FIG. 10) for checking whether to execute a forced-termination process of SimplePrint is displayed. When "execution" is touched on the check screen of FIG. 10, SimplePrint will be forced to terminate.

Figure 11:
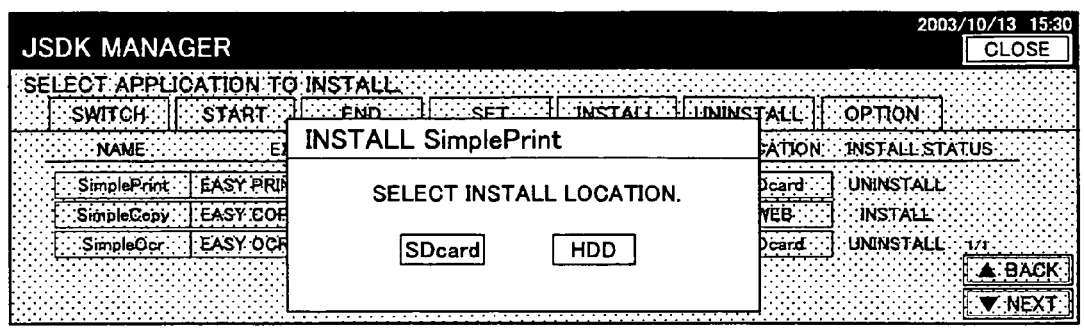
FIG. 11 is an illustration of a check screen for checking installation location of SimplePrint of which storing-origin is an SD card.

A description will be given of the installing operation screen of FIG. 7D. According to the installing process of the user applications 501, an unregistered user application 501 is registered as user application that can be started. A list of user applications 501 as objects to which the installing operation is applied is displayed on the installing operation screen of FIG. 7D together with a status of the installation. If "SimplePrint" is touched on the installing-operation screen of FIG. 7D, a check screen (FIG. 11) which checks the installation location of SimplePrint of which storing-origin is the SD card is displayed. When "SD card" is touched on the check screen of FIG. 11, SimplePrint is installed as the location of installation being "SD card". When "HDD" is touched on the check screen of FIG. 11, SimplePrint is installed as the location of installation being set to HDD.

A description will be given of the uninstalling operation screen FIG. 7E. According to the uninstalling process of the user application 501, the user application 501, which has been registered as an application to be started, is deleted from the registration list of user applications that can be started.

Figure 12:
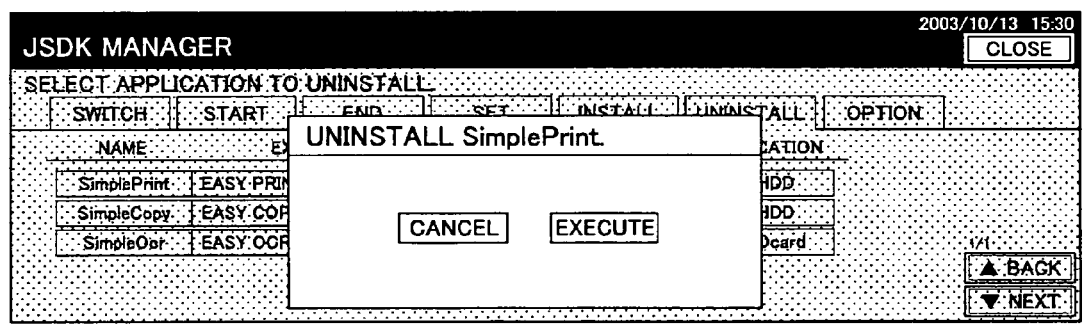
FIG. 12 is a check screen for checking whether to execute an uninstalling process of SimplePrint.

The list of the user applications 501 which have been registered as objects to be subjected to an uninstalling operation is displayed on the uninstalling operation screen of FIG. 7E. If "SimplePrint" is touched on the uninstalling operation screen of FIG. 7E, a check screen (FIG. 12), which checks whether to execute an uninstalling process of SimplePrint, is displayed. SimplePrint is uninstalled if "execution" is touched on the check screen of FIG. 12.

Figure 13:
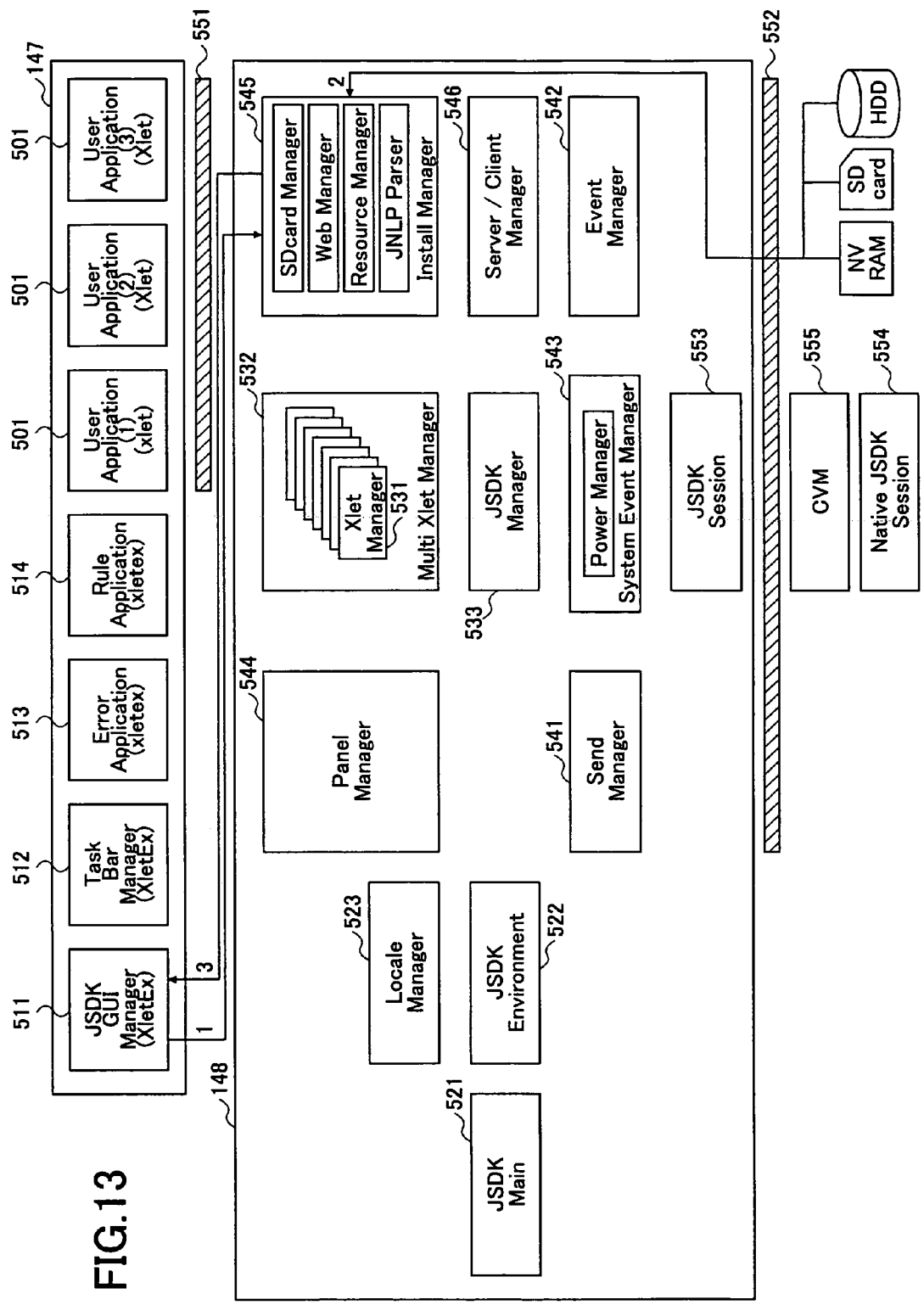
FIG. 13 is a block diagram of a JSDK application and a JSDK platform for explaining a procedure of displaying operation screens.

FIG. 13 is a block diagram of the JSDK application and the JSDK platform for explaining a procedure of displaying the operation screens. If the start button is touched on the switching operation screen, a request for the list of the user applications 501, which have been installed, is sent from the JSDK GUI manager 511 to the install manager 545 (step S1). In response to the request, install manager 545 acquires JNLP files of the installed user applications 501 based on information regarding locations of the installed user applications 501 (stored in an NVRAM in the combination machine 101) (step S2). JNLP files of the user applications 501 in the SD card are acquired from the SD card loaded to the combination machine 101. JNLP files of the user applications 501 in the HDD are acquired from the HDD provided in the combination machine 101. The JNLP files correspond to the user applications 501 on one-to-one basis, and each of the JNLP files contains information regarding definition of the respective one of the user applications 501. Thus, the list of the user applications 501, which have been installed, is sent from the install manager 545 to the JSDK GUI manager 511 based on the contents of the JNLP files of the installed user applications 501 (step S3). Accordingly, the display is shifted from the switching operation screen to the starting operation screen.

Figure 14:
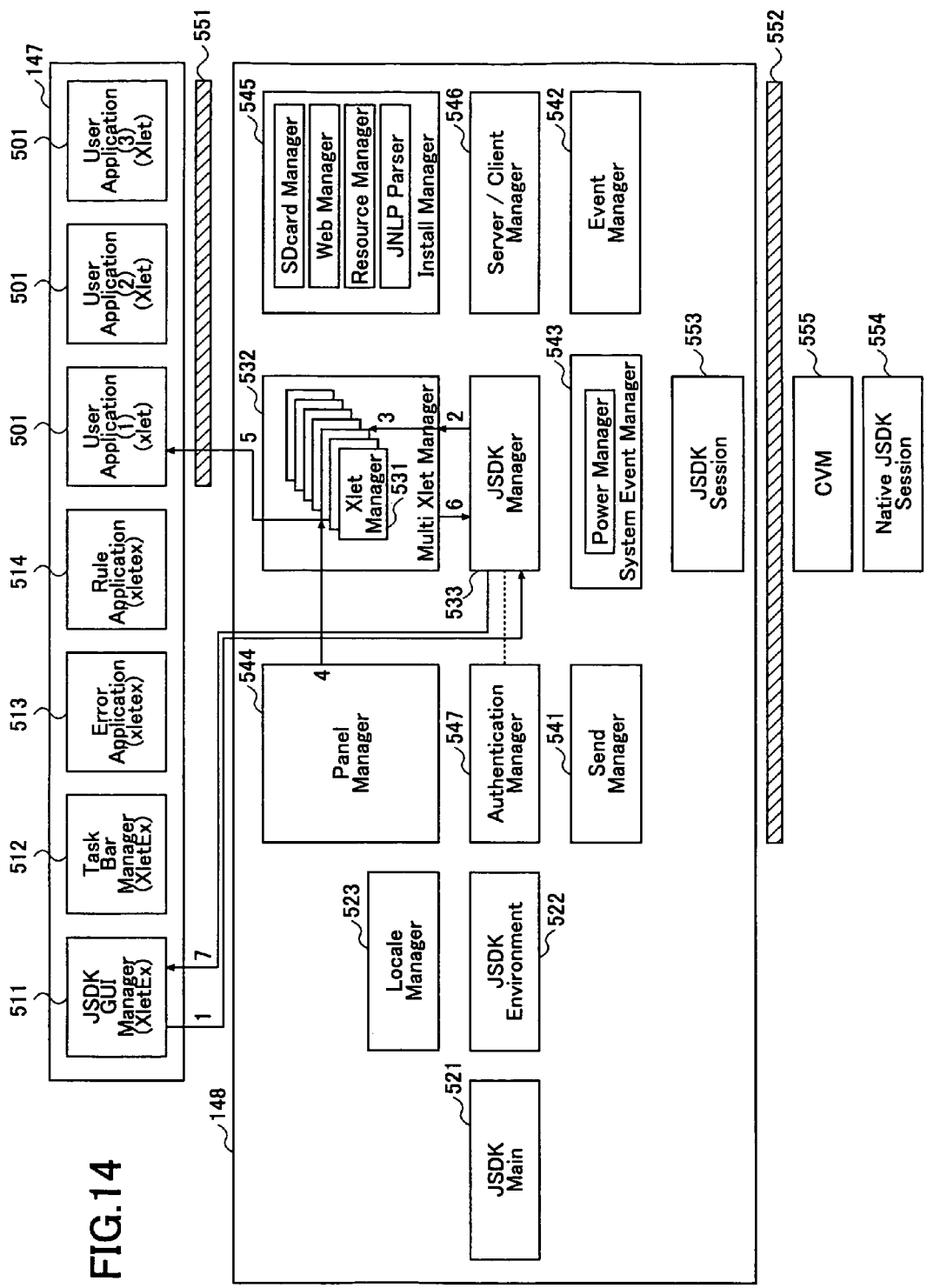
FIG. 14 is a block diagram of the JSDK application and the JSDK platform for explaining a procedure of executing a starting process of the user application.

FIG. 14 is a block diagram of the JSDK application and the JSDK platform for explaining a procedure of executing a starting process of the user application. When a selecting operation is performed on the starting operation screen and a checking operation is performed on the checking screen, a request for starting the user application 501 is sent from the JSDK GUI manager 511 to the JSDK manager 533 (step S1). Subsequently, the request for starting the user application 501 is sent from the JSDK manager 533 to the multi Xlet manager 532 through an authentication process by the authentication manager 547 (step S2). In response to the request, the multi Xlet manager 532 cause the Xlet manager 531 to start (step S3), the Xlet Manager 531 acquires a root window from the panel manager 544 (step S4), and the Xlet manager 531 cause the user application 501 to start (step S5). Then, a start response of the user application 501 is sent from the multi Xlet manager 532 to the JSDK manager 533 (step S6). Subsequently, the start response of the user application 501 is sent from the JSDK manager 533 to the JSDK GUI manager 511 (step S7).

Figure 15:
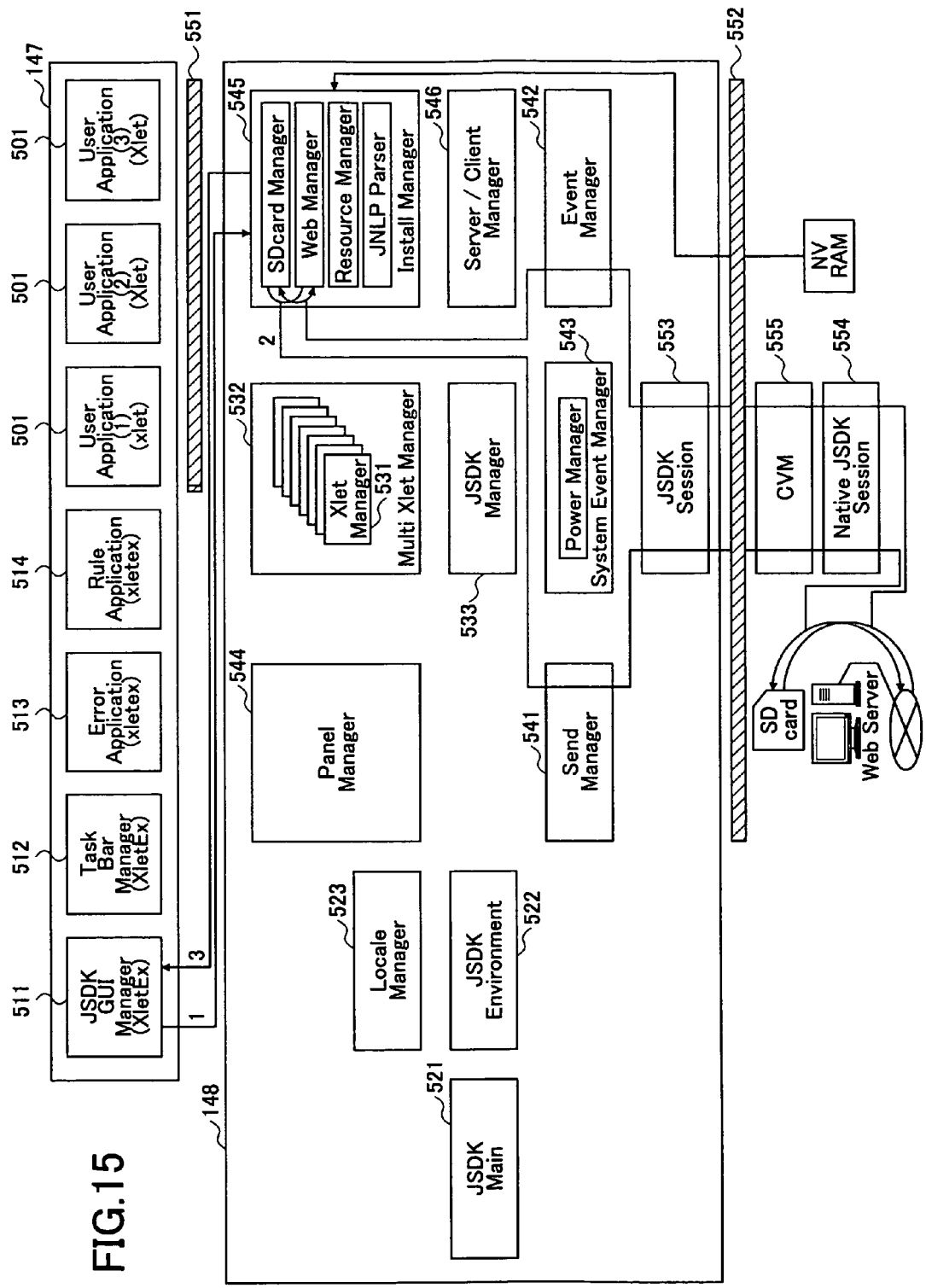
FIG. 15 is a block diagram of the JSDK application and the JSDK platform for explaining a procedure of displaying the installing operation screen.

FIG. 15 is a block diagram of the JSDK application and the JSDK platform for explaining a procedure of displaying the installing operation screen. If the button for installation is touched on the switching operation screen, a request for the list of user applications 501 is sent from the JSDK GUI manager 511 to the install manager 545 (step S1). Accordingly, the install manager 545 acquires the JNLP files of the user applications 501 (step S2). The install manager 545 acquires the JNLP files of the user applications 501 in the SD card that is loaded to the combination machine 101. Additionally, the install manager 545 acquires the JNLP files of the user applications 501 in the Web server that is connected to the combination machine 101 through a network. The JNLP files correspond to the user applications 501 on one-to-one basis, and each of the JNLP files contains information regarding definition of the respective one of the user applications 501. Then, a response of the list of the user applications 501 is sent from the install manager 545 to the JSDK GUI manager 511 (step S3) based on information regarding a status of installation of the user applications 501 (stored in the NVRAM provided in the combination machine 101) and the contents of the JNLP files of the user applications 501. Accordingly, the display is shifted from the switching operation screen to the installing operation screen.

Figure 16:
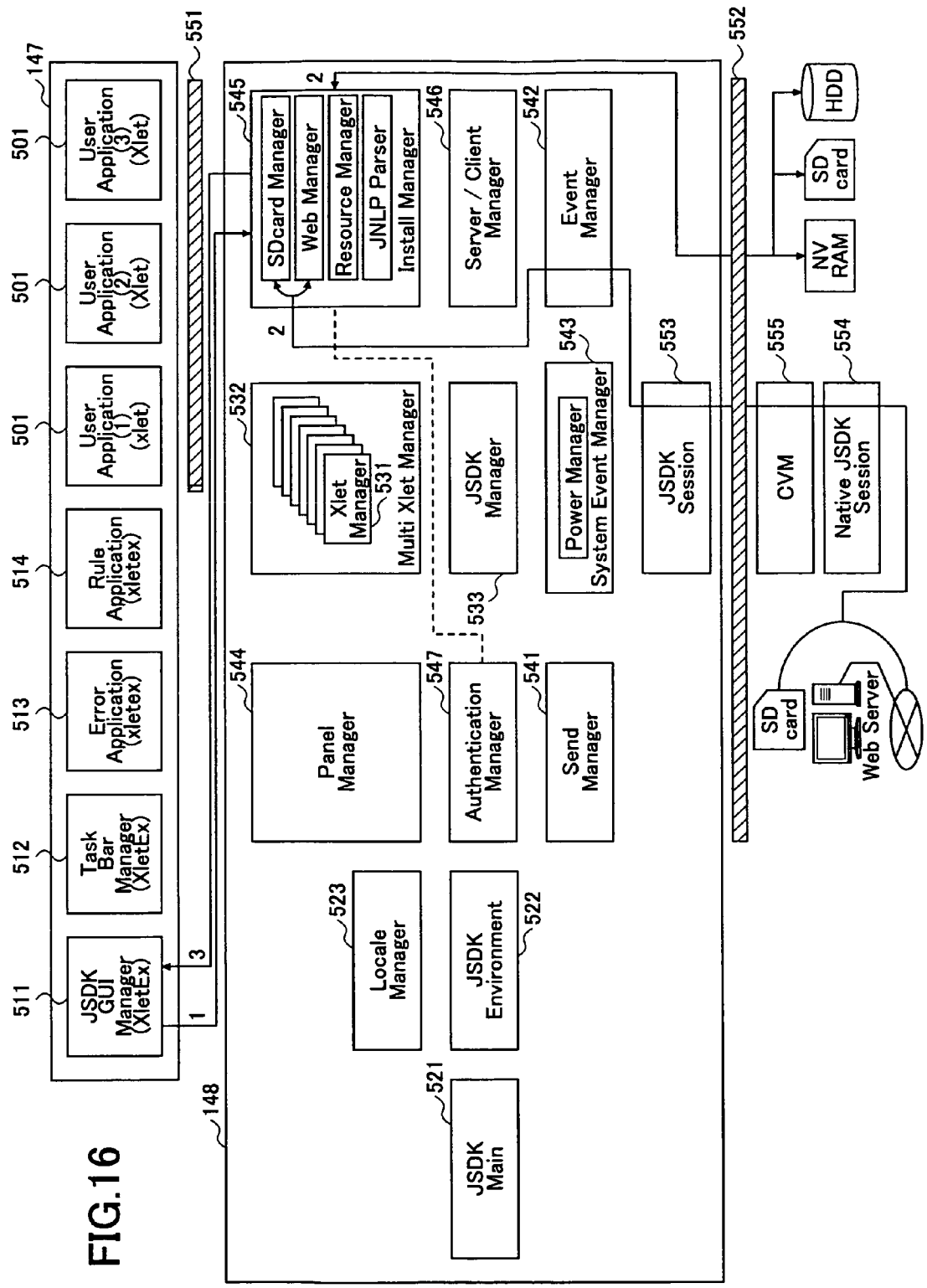
FIG. 16 is a block diagram of the JSDK application and the JSDK platform for explaining a procedure of executing the installing process.

FIG. 16 is a block diagram of the JSDK application and the JSDK platform for explaining a procedure of executing the installing process. When a selecting operation is performed on the installing operation screen and a checking operation is performed on the checking screen, a request for installing user application 501 is sent from the JSDK GUI manager 511 to the install manager 545 (step S1). Subsequently, the install manager 545 installs the user application 501 through an authentication process by the authentication manager 547 (step S2). Then, a response of installation of the user application 501 is sent from the install manager 545 to the JSDK GUI manager 511 (step S3).

FIG. 17 illustrates an example of syntax of the JNLP file. The JNLP (Java (registered Trademark) Network Launching Protocol) file is an XML (extensible markup language) file, and the JNLP file format is based on the JNLP specification. However, there is a part which has given original extension for JSDK, and such a part will be explained below.

In FIG. 17, a description 1 is an information element that contains a title element (description 1A) indicating an application name, a vender element (description 1B) indicating a vender name, a telephone element (description 1C) indicating a telephone number of the vender, a facsimile element (description iD) indicating a facsimile telephone number of a vender, and a product ID element (description 1E) indicating a product ID of an application.

A description 2 is a security element.

A description 3 is a resource element that contains a JSDK element (description 3A) designating a version of JSDK, a jar element (description 3B) designating a JAR file (execution file of an application) and its version, and a sub-jnlp element (description 3C) designating a SUB-JNLP file.

A description 4 is an update element that is for setting a method of performing an updating process. If auto is indicated, the updating process of an application is performed automatically, if manual is indicated, the updating process of the application is performed manually, and if mail is indicated and when an updating process of the application can be executed, an update notification is distributed to announce the fact.

A description 5 is an install element that sets a method of executing the installing process. If auto is indicated, the location of installation of the application is automatically selected. If manual is indicated, the location of installation is selected manually.

A description 6 indicates whether the type of application is "with GUI" or "without GUI". As mentioned with respect to the update element, the installed JSDK application 147 is set as an object to be subjected to the update process.

Figure 18:
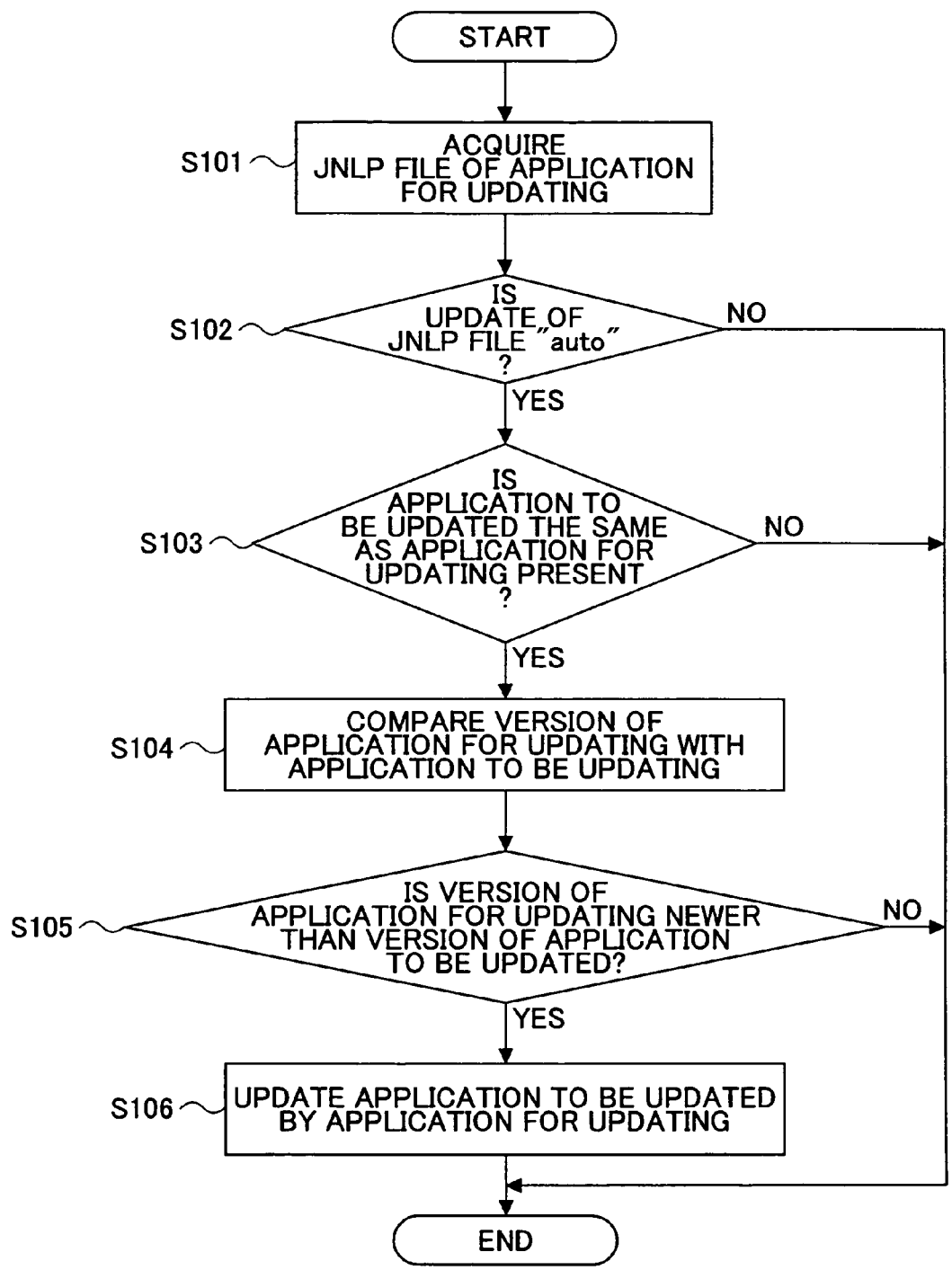
FIG. 18 is a flowchart of an automatic update process that automatically updates a JSDK application in an SD card or an HDD.

A description will now be given an automatic update process that automatically updates the installed JSDK application 147. FIG. 18 is a flowchart of the automatic update process that automatically updates the JSDK application 147 in the SD card or the HDD to a JSDK application 147 (application for updating) from the SD card. When an update SD card is set to the update SD card slot connected to the combination machine 101, the platform 148 acquires the JNLP file of the application for updating provided in the update SD card (step S101).

If the update element indicates "auto" and there is present an application to be updated which is the same as the application for updating relating to the JNLP file (steps S102 and S103), the JSDK platform 148 compares the version of the application for updating with the application to be updated (step S104). If the version of the application for updating is newer than the application to be updated (step S105), the application to be updated is updated by the application for updating (step 106).

Figure 19:
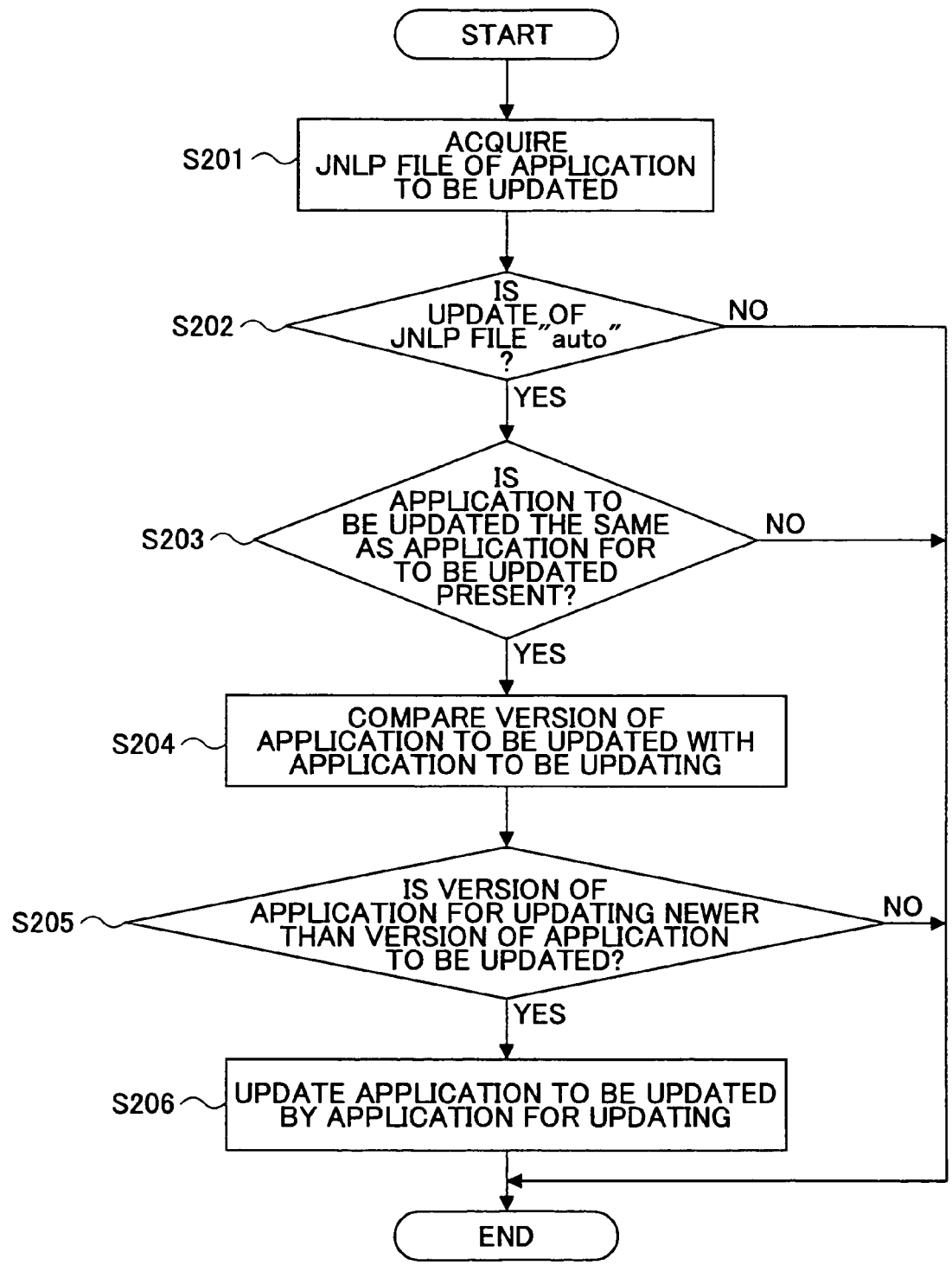
FIG. 19 is a flowchart of an automatic update process that automatically updates a JSDK application in an SD card or an HDD.

FIG. 19 is a flowchart of the automatic update process that automatically updates the JSDK application 147 in the SD card or the HDD to a JSDK application 147 (application for updating) from Web. The platform 148 acquires the JNLP file of the application to be updated (step S201). If the update element of the acquired JNLP file indicates "auto" and there is present an application for updating the same as the application to be updated relating to the JNLP in the Web server connected to the combination machine 101 through a network (steps S202 and S203), the JSDK platform 148 compares the version of the application for updating with the application to be updated (step S2104). If the version of the application for updating is newer than the application to be updated (step S205), the application to be updated is updated by the application for updating (step 206).

A description will now be given of a life cycle of the Xlet mentioned with reference to FIG. 5.

Figure 20:
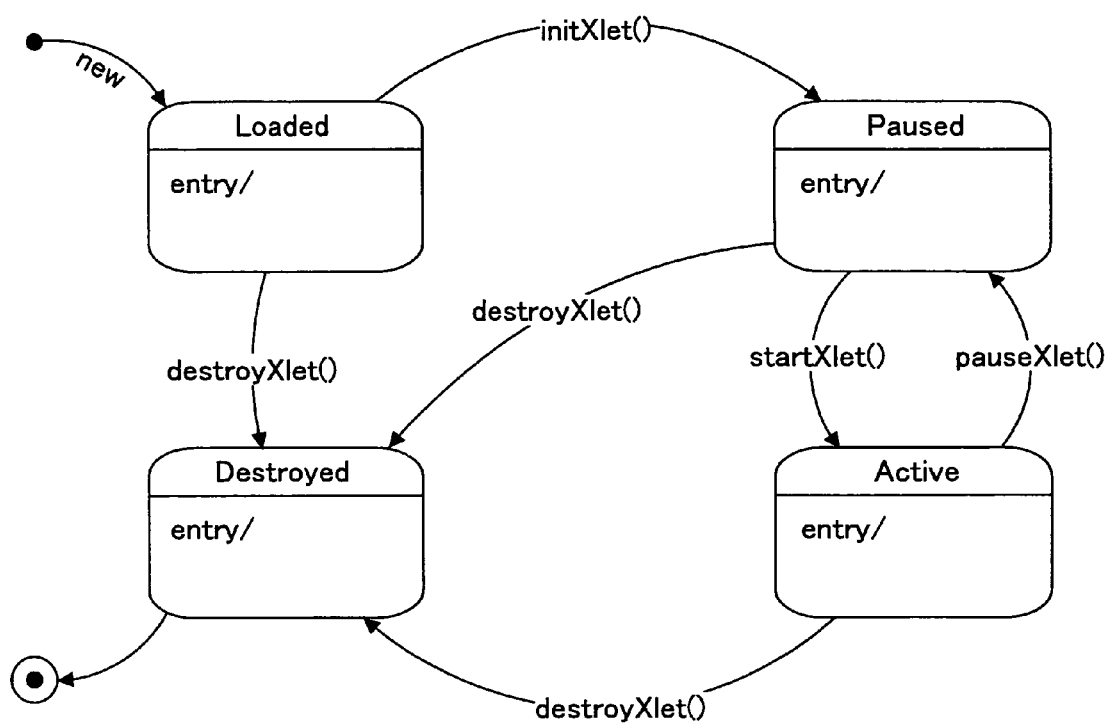
FIG. 20 is a state transition diagram of Xlet.

FIG. 20 is a state transition diagram of Xlet. As a state of the Xlet, there are an initialization state (loaded), a stop state (paused), an activated state (active) and an end state (destroyed). The state of the Xlet transits according to method calls such as an initial (initXlet), a start (startXlet), a stop (pauseXlet) and an end (destroyXlet), etc.

The life cycle of the Xlet corresponds exactly to such as state transition of the Xlet. However, there may be many variations as to what state exists or how the state transits. This is the same also in the Xlet manager, the multi Xlet manager and other managers. The initialization state is a state immediately after generation of an Xlet instance. The transition to the initialization state is limited to once. The stop state is a state where service is stopped. The active state is a state where service is being provided. The transition between the stop state and the active state can be done any number of times. The end state is a state immediately after the Xlet instance is deleted. The transition to the end state is limited to once. As mentioned with reference to FIG. 5, the life cycle of the JSDK application is managed by the JSDK platform 148. For example, when the JSDK application 147 is to start, stop or end, the JSDK application 147 requests the start, stop or end of its own to the JSDK platform 148. It is a merit for managing the life cycle of the JSDK application 147 by the JSDK platform 148 that the memory capacity can be saved. Especially, in a multi-thread in which each of many JSDK applications 147 is performed as a thread, the above-mentioned merit provides a large existence value. It is a merit for setting the JSDK on 147 as the Xlet that the life cycle management of the JSDK application is easy.

1) Error Application

Figure 21A:
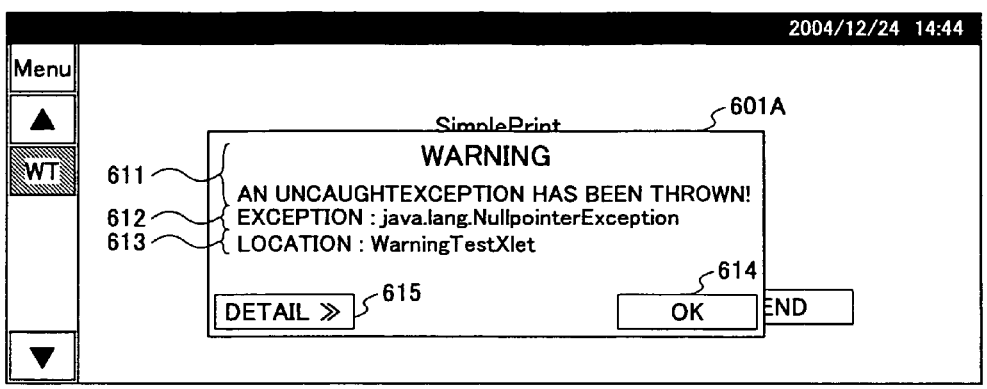
FIG. 21A is an illustration of an error occurrence display dialog.
Figure 21B:
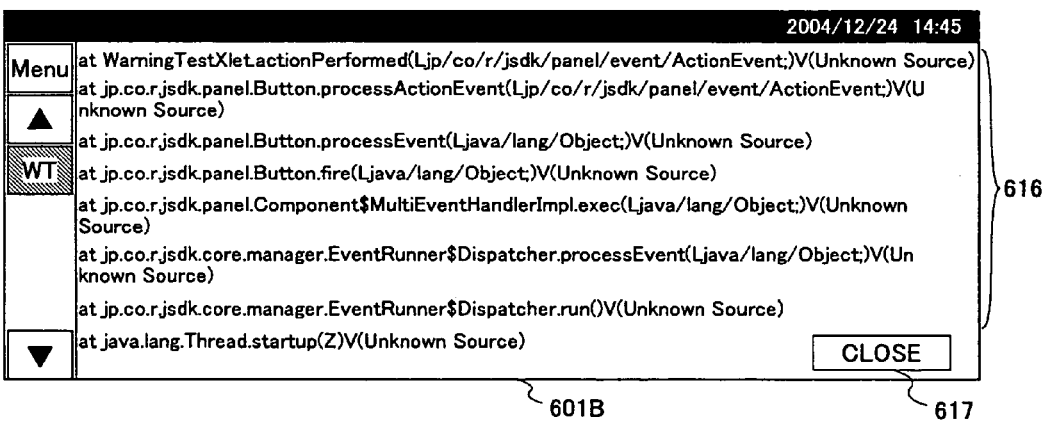
FIG. 21B is an illustration of an error occurrence display dialog.

A description will be given of the error application 513 shown in FIG. 5. The error application 513 is a JSDK application that displays information indicating that an error has occurred when the error occurred in other JSDK applications. The information indicating that the error has occurred is displayed by an error occurrence display dialog 601A shown in FIG. 21A on a foremost face of the operation panel 202 of the combination machine 101. In the error occurrence display dialog 601A of FIG. 21A, as information regarding occurrence of error, an error message 611, a kind of error 612 and location of occurrence of an error 613, etc., are displayed. If the OK button 614 is pushed, the error occurrence display dialog 601A is closed. By pushing the detail button 615, the display is shifted to an error occurrence display dialog 601B shown in FIG. 21B. A detail 616 of the error as information regarding occurrence of error is displayed in the error occurrence display dialog 601B. By pushing the close button 617, the error occurrence display dialog is closed. The above-mentioned information may be sent to external equipments through a network. For example, the information may be sent to a service center so that a support of the service center can be received.

Here, an exception of Java (Registered Trademark) is handled as an error. Here, when an exception thrown by other JSDK applications is not caught, the error application 513 displays information indicating that the thrown exception is not caught. The exchange of exception here uses a thread group of Java (Registered Trademark). The thread group has a function that ThreadGroup.uncaughtException method is called by the Java (Registered Trademark) virtual machine if an exception thrown by another thread belonging to the thread group. The thread group further has a function to access information regarding other threads belonging to the thread group. There is a further function to set a relationship between parents and children (a tree structure) in the thread group. There is a further function to register a name of each thread group.

FIG. 22 is a block diagram for explaining a setting process of a thread group. When producing managers such as the multi Xlet manager 532, the JSDK manager 533 gives a thread group to the managers such as the multi Xlet manager 532 (step S1). Each manager such as the multi Xlet manager 532 produces a thread using the thread group. By using this, the multi Xlet manager 532 manages the life cycle of the Xlet manager 531.

When producing each Xlet manager 531, the multi Xlet manager 532 gives a thread group to each Xlet manager 531 (S2). Each Xlet manager 531 produces a thread using the thread group concerned. Using this, the Xlet manager 531 manages information regarding a status of the Xlet and a life cycle of the user application 501. The Xlet manager 531 gives a thread group to the Xlet of the user application 501 when the Xlet of the user application 501 produces a sub-thread (step S3). The Xlet of the user application 501 produces a thread using the thread group concerned. Thus, a tree-structure of the thread groups is formed. The top-end of the tree-structure of the thread groups is managed by the JSDK manager 533.

FIG. 23 is a sequence chart of the error occurrence display process. First, when the error application 513 is started (step S1), a notification registration is requested by the error application 513 to the JSDK manager 533, the notification registration indicating that the manager 533 notifies the error application 513 of a fact that an error has occurred (step S12). Then, when error occurs (step S21), ThreadGroup.uncaughtException method of the JSDK manager 533 is called by the CVM 555 (step S2.2). Subsequently, the method of the JSDK manager 533 sends a notification to the error application 513 that an error has occurred in accordance with a notification registration (step S23). Thereafter, a request is made by the error application 513 to the multi Xlet manager 532 to display the error occurence display dialog on the forefront face (step S24). Thus, the error occurrence display dialog 601 is displayed on the forefront face by the multi Xlet manager 532 (step S25).

2) Rule Application

Figure 24:
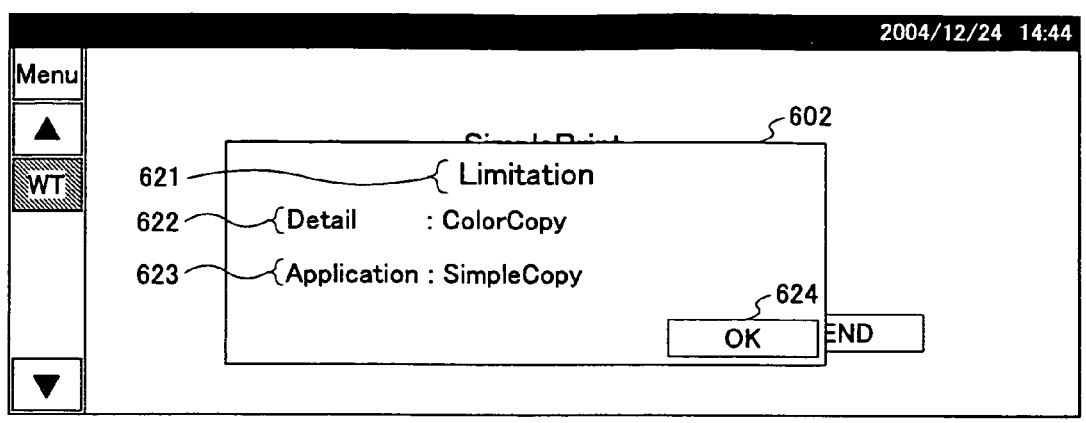
FIG. 24 is an illustration of a rule violation display dialog.

A description will be given of the rule application 514 shown in FIG. 5. The rule application 514 is a JSDK application which displays information indicating that there has been a rule violation when the rule violation occurs in a process request of other JSDK applications. The information indicating that there has been a rule violation is displayed in a manager that a rule violation display dialog 602 is displayed on the forefront face of the operation panel 202 of the combination machine 101 as shown in FIG. 24. As information relating to a rule violation, a rule violation message 621, a kind of rule violation 622, a location of rule violation 623, etc., are displayed in the rule violation display dialog 602. By pushing the OK button 624, the rule violation display dialog 602 is closed. Such information may be made to be sent to external equipments through a network.

As the rule violation here, a rule violation of a service request made by the JSDK application to the API 551. As a specific example of the rule violation of the service request, there are a rule violation associated with a limit of a number of threads, a rule violation associated with a limit of a number of files opened, a rule violation associated with a printing process such as a color/monochrome setting, a print paper size or a number of print papers, and a rule violation associated with a scan process such as a color/monochrome setting, a paper size or a number of papers. Here, the rule application 514 displays information indicating the rule violation when the rule violation occurs in the service request made by other JSDK application to the API 551. The thread group of Java (registered Trademark) is used for monitoring the rule violation.

FIG. 25 is a sequence chart of the rule violation display process. First, when the rule application is started (step S31), a request of a notification registration is made by the rule application 514 to the multi Xlet manager 532, the notification registration indicating that the multi Xlet manager 532 notifies the rule application 514 of a fact that a rule violation has occurred (step S32). Then, when a service request is made by the JSDK application to the API 551 (step S41) next, the JSDK API 551 acquires information regarding a thread group of the requestor of the service (step S42). Thereafter, a request of information whether or not the thread of the requestor has a right to receive the service is made by the JSDK API 551 to the multi Xlet manager (step S43). Then, the thread of the requestor of the service is specified by the multi Xlet manager 532 based on the thread group (S44). Next, the multi Xlet manager 532 investigates whether the thread of the requester of the service has a right to receive the service (step S45). If the thread of the requestor of the service has no right to receive the service, the multi Xlet manager 532 notifies the rule application 514 of the fact that there have been occurred a rule violation in the service request to the API 551 in accordance with the notification registration (step S46). Then, a request to display the rule violation display dialog 602 on a forefront face is made by the rule application to the multi Xlet manager 532 (step S47). Then, the rule violation display dialog 602 is displayed on the forefront face by the multi Xlet manager 532.

3) Image Forming Process

FIGS. 26A, 26B and 26C are illustrations of the combination machine 101 for explaining an image forming process that can be performed in the combination machine 101. In the combination machine 101, image data for image forming process is stored in a file of a storing format in which memory areas are consecutively arranged, and the file is stored in the HDD. Such a file is referred to as a "RAW file". In the file system of UNIX (Registered Trademark), data for information processing is stored in a file of a storing format in which memory areas are arranged in a discrete manner, and the file is stored in the HDD. Such a file is referred to as an "FFS file".

Although the RAW file is superior to the FFS file in respect of a high-speed reading and writing, the FFS file is superior to the RAW file in respect of providing files from the combination machine 101 to a PC or the like. FIG. 26A is an illustration for explaining a printing process of a scan image. A scan image is accumulated in HDD as the RAW file 631. In the printing process, the image data accumulated in the HDD as the RAW file 631 is printed. FIG. 26B is an illustration for explaining a saving process of a scan image. The scan image is accumulated in the HDD as the RAW file 631, and is converted into the FFS file 632 from the RAW file 631, and is stored in the HDD as the FSS file 632. FIG. 26C is an illustration for explaining a printing process of a saved image. The saved image is stored in the HDD as the FFS file 632. In the printing process, the image data stored in the HDD as the FFS file 632 is printed.

(Emulator)

Figure 27:
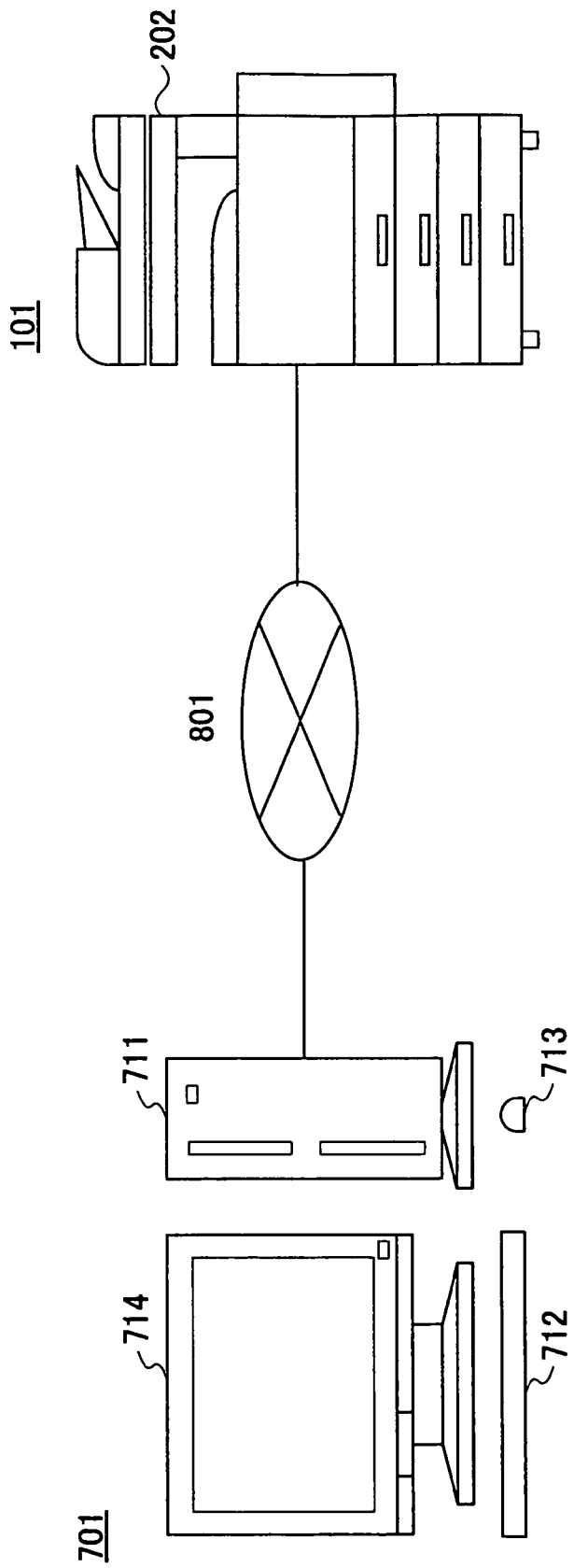
FIG. 27 is an illustration of the combination machine and a personal computer (PC) serving as an emulator.

FIG. 27 is an illustration of a combination machine 101 and a personal computer (PC) serving as an emulator. The PC 701 shown in FIG. 27 is connected to the combination machine 101 through a network 801, and serves as an emulator of the combination machine 101. The PC 701 of FIG. 27 comprises a PC body 711, a keyboard 712, a mouse 713 and a display 714. There is provided in the PC body 711 a CPU, a ROM, a RAM, an NVRAM, an HDD, a MODEM, a NIC, etc. The keyboard 712 and the mouse 713 serve as a hardware (an operation unit) through which an operator performs an input instead of the operation panel 202 of the combination machine 101. The display 714 serves as a hardware (display part) for an operator acquiring an output instead of the operation panel 202 of the combination machine 101.

Figure 28:
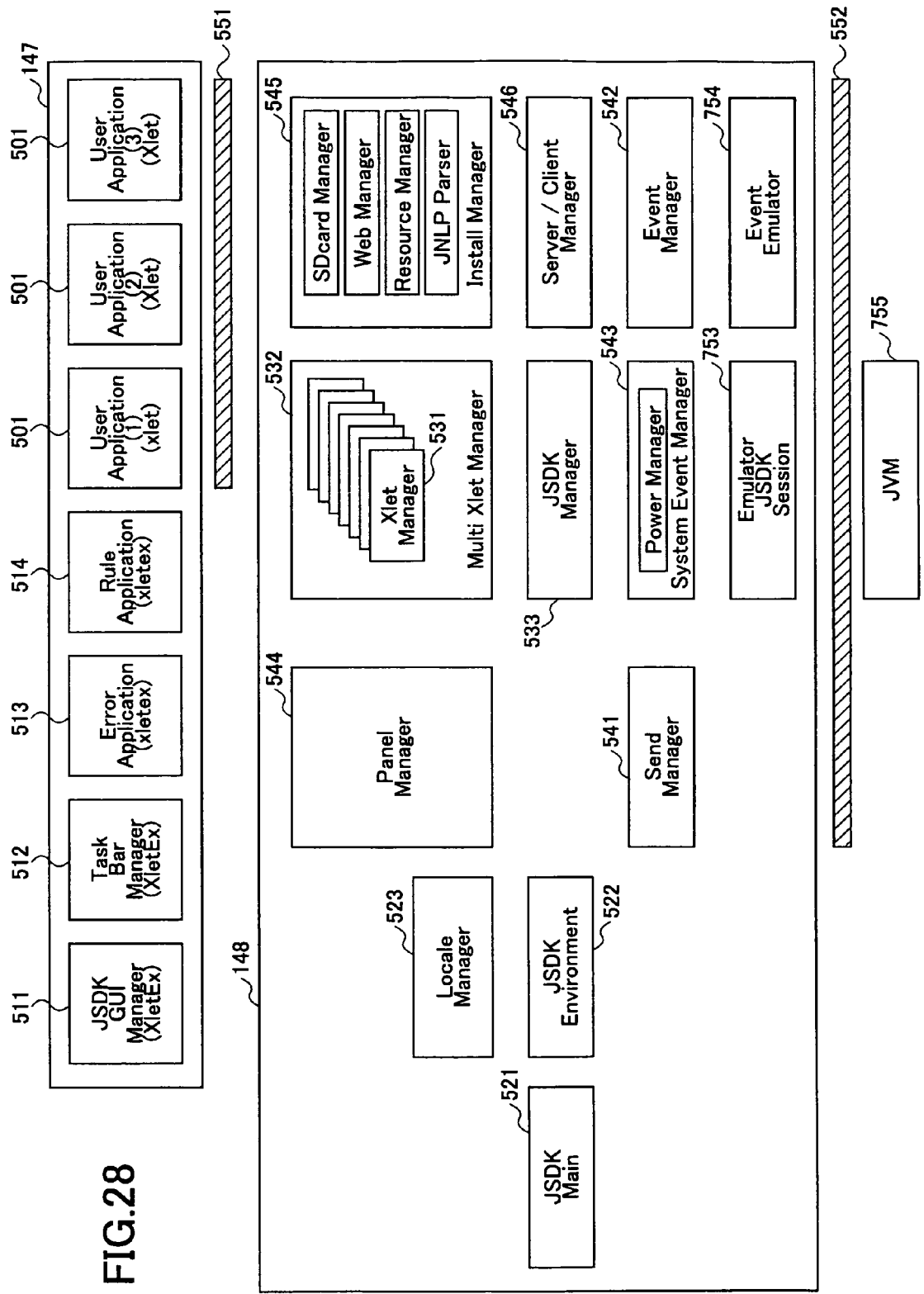
FIG. 28 is a class diagram of the JSDK application and the JSDK platform in the PC shown in FIG. 27.

FIG. 28 is a class diagram of the JSDK application 147 and the JSDK platform 148 in the PC 701 shown in FIG. 27. The JSDK application 147 and the JSDK platform 148 the same as that of the combination machine 101 of FIG. 1 are provided in the PC 701. The class diagram of the JSDK application 147 and the JSDK platform 148 provided in the combination machine 101 is shown in FIG. 5.

Hereafter, the difference between the structure of FIG. 5 and the structure of FIG. 28 will be explained. First, the panel manager 544 of FIG. 5 is substituted by a panel manager emulator 744 of FIG. 28. Second, the JSDK session 553 of FIG. 5 is substituted by an emulator JSDK session 753 of FIG. 28. Third, the native JSDK session 554 of FIG. 5 is substituted by an event emulator 754 of FIG. 28. Fourth, the CVM 555 of FIG. 5 is substituted by a JVM 755 of FIG. 28.

The panel manager emulator 744 is a class which emulates the panel manager 544 so as to convert an operation performed on the operation panel 202 into an operation on the keyboard 712 or the mouse 713. The emulator JSDK session 753 is a class which performs an establishing process of a communication path. The event emulator 754 is a class which emulates an operation of the combination machine 101. The JVM 755 is a Java (Registered Trademark) virtual machine for achieving the JSDK application 147 and the JSDK platform 148.

It should be noted that a starting procedure of the JSDK system in the PC 701 is the same as that shown in FIG. 6. Additionally, a GUI of the JSDK system in the PC 701 is the same as that shown in FIGS. 7 through 12. The GUI concerned corresponds to operation screens and task bars that set the user application 501 as an object to be operated, and is displayed the JSDK GUI manager 511 through the task bar manager 512 provided in the PC 701. The operation part corresponds to the keyboard 712 and the mouse 713, and the display part corresponds to the display 714.

Figure 29:
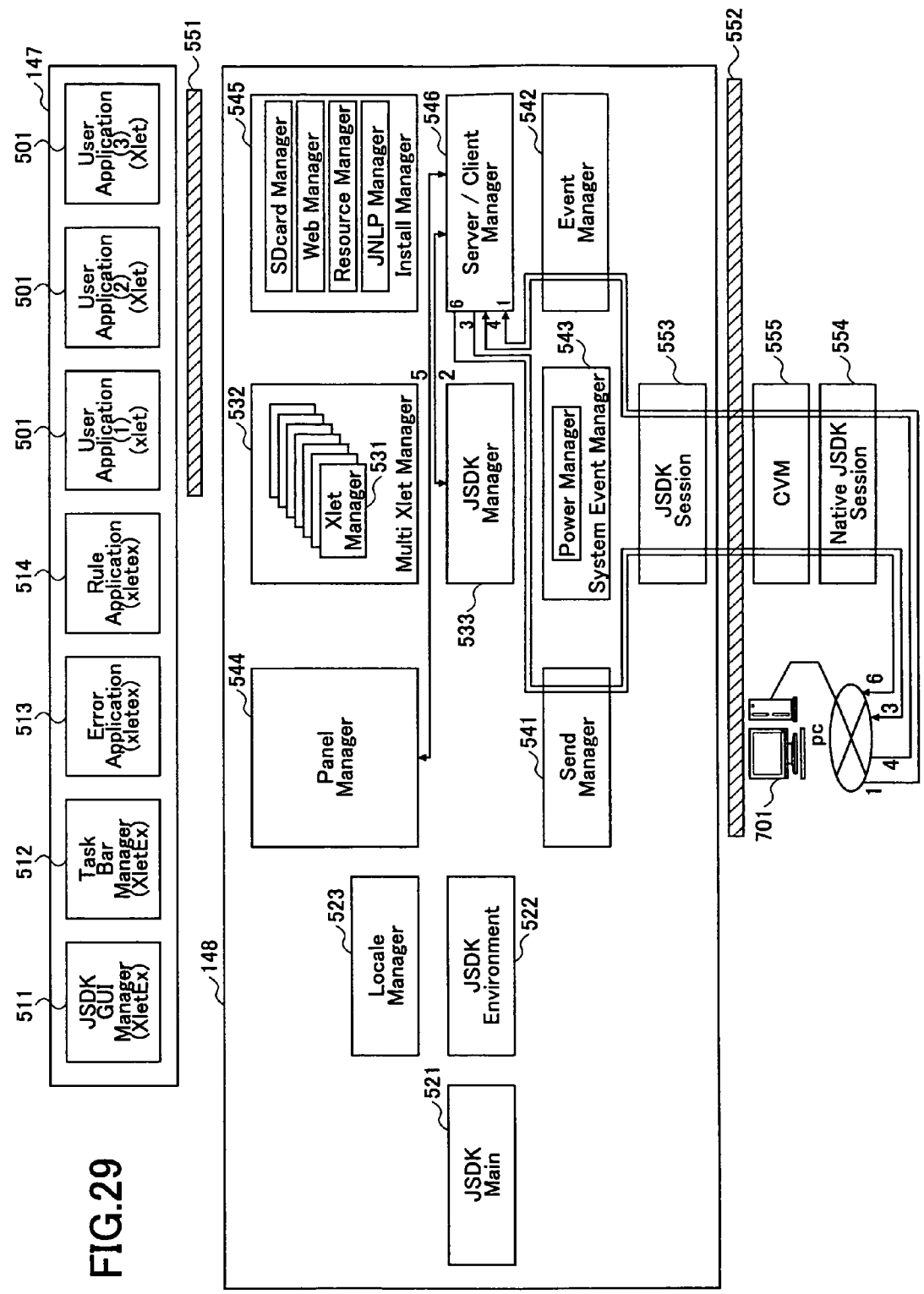
FIG. 29 is a block diagram for explaining a procedure of a preparing process of a remote operation.

FIG. 29 is a block diagram for explaining a procedure of a preparing process of a remote operation, which is performed in the combination machine 101 of FIG. 1. First, a session is established between the server/client manager 546 in the combination machine 101 and a server/client manager 546 in the PC 701 (step S1). Then, the server/client manager 546 in the combination machine 101 inquires the JSDK manager 533 in the combination machine 101 whether it can be shifted to a remote operation so as to determine whether it is possible to shift to the remote operation (step S2). Thereafter, the server/client manager 546 in the combination machine 101 sends a request concerning a message required for the remote operation to the PC 701 through the send manager 541 provided in the combination machine 101 (step S3), and receives a response concerning the message required for the remote operation from the PC 701 through the event manager 542 in the combination machine 101 (step S4). Then, the server/client manager 546 in the combination machine 101 sends a request for transferring information for the remote operation to the PC 701 to the panel manager 544 (step S5). Finally, a notification indicating that the preparing process of the remote operation is completed is exchanged between the server/client manager 546 in the combination machine 101 and the server/client manager 546 in the PC 701 (step S6). Accordingly, the remote operation of the combination machine 101 by the PC 701 is attained.

4) Power Control

A description will now be given of a power control of the combination machine 101 of FIG. 1.

Power supply mode of the combination machine 101 includes an "ON-mode", which corresponds to a state where a power supply is turned on, and an "OFF-mode", which corresponds to a state where a power supply is turned off. Although it is desirable to always set the combination machine 101 into the ON-mode so as to be in a standby state of an image forming process from a viewpoint of convenience, it is not preferable from a viewpoint of power saving to always set the combination machine 101 into the ON-mode so as to be in a standby state of an image forming process. Therefore, the ON-mode includes, in addition to the normal "standby mode", which is under standby of an image forming process, various kinds of "power-saving mode" for saving power consumption during standby of an image forming process.

In the power-saving mode, a power source to component parts consuming a large power, such as an electric heater of the print part 122, a spindle motor of the HDD 233, a panel of the touch panel 311 or the like, during standby of an image forming process being set in a power-saving state, and, on the other hand, component parts consuming a small power, such as a power supply to the NIC 241 or the like are maintained to be in the standby state. Thus, the viewpoint of convenience and the viewpoint of energy-saving are compossible.

As examples of the power-saving mode, there are a "light-off mode", a "preheating mode" and a "night mode". In the light-off mode, a power supply to a heater is in a standby state, a power supply to a motor is in a standby state and a power supply to a panel is in a power-saving state. In the preheating mode, a power supply to a heater is in a preheating state, a power supply to a motor is in a power-saving state and a power supply to a panel is in a power-saving state. In the night-mode, a power supply to a heater is in a night state, a power supply to a motor is in a power-saving state and a power supply to a panel is in a power-saving state. In any mode, power consumption in the standby mode is smaller than power consumption in the power-saving mode.

When a fixed time (3 minutes, etc.,) passes in the standby mode or a fixed time zone (midnight, etc.) is reached, it shifts to power-saving mode. When an operation of the combination machine 101 is performed in the power-saving mode, it shifts to the standby mode. When a fixed time (3 minute, etc.,) passes in the power-saving mode or a fixed time zone (midnight, etc.) is reached, it shifts to the OFF-mode. When facsimile image data, scan data or print data is received, it shifts to the power-saving mode. When a power button is turned off, the power supply mode shifts from the ON-mode (the standby mode or the power-saving mode) to the OFF-mode. When a power button is turned on, the power supply mode shifts from the OFF-mode to the ON-mode.

Figure 30:
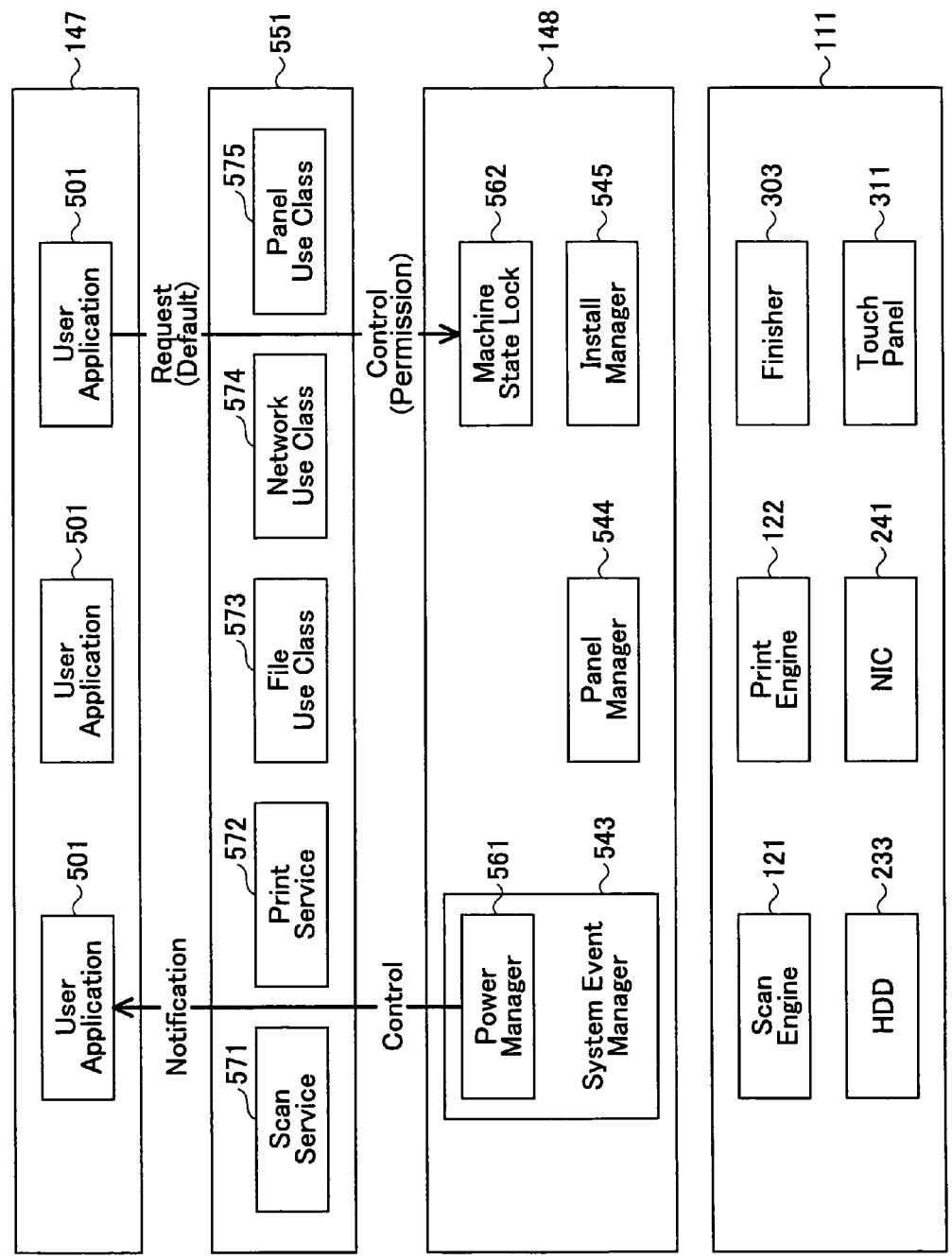
FIG. 30 is a block diagram for explaining a power control of the combination machine.

FIG. 30 is a block diagram for explaining a power control of the combination machine 101. A problem arisen in performing a power control of the combination machine 101 is that which software performs the power control of the combination machine 101. For example, if an application is caused to perform a power control, the application performs the power control in association with a platform. This is not difficult for an incorporated application but difficult for an SDK application since it may be difficult to develop such an application or power-saving criteria of the entire apparatus may not be satisfied due to inappropriate power control. Further, it is not easy to judge which equipment should be set in which state when performing an image forming process or when executing an application of an image forming process.

Therefore, it is desirable to cause a platform to perform a power control. FIG. 30 shows the JSDK application 147, the JSDK platform 148 and a JSDK API 551 which is an API of the JSDK system. As shown in FIG. 30, the JSDK platform 148 is provided with a manager 561 and a machine state lock 562.

The power manager 561 is a class which controls whether to permit or prohibit a shift to power-saving of component parts constituting the combination machine 101 in accordance with an executing condition of an image forming process or an executing condition of an application (JSDK application 147).

The machine state lock 562 is a class which controls whether to permit or prohibit a shift to power-saving of component parts constituting the combination machine 101 in accordance with a control request from an application (JSDK application 147) for an image forming process. As to a power control of the power manager 561, the application is involved passively.

Accordingly, it is no need to judge by the application itself as to which equipment is to be set in which power state. As to a power control of the machine state lock 562, the application is involved actively. This is used when the application performs a process taking a long time such as an image processing and when the application itself is required to prohibit a shift to a power-saving state.

It should be noted that although the machine state lock 562 controls a shift to power-saving of the component devices based on the control request with respect to the component devices of which control request is made by the application for an image forming process made a control request, a shift to power-saving is permitted as a default with respect to component devices of which control request is not made by the application for an image forming process. As to a power control of the machine state lock 562, the application is required to be involved actively when it is needed.

FIG. 30 shows, as component devices of the combination machine 101, a scan engine (corresponding to the image taking part 121), a print engine (corresponding to the printing part 122), the HDD 233, the NIC 241 and the touch panel 311. As shown in FIG. 30, in the JSDK API 551, there are provided as "application open classes" a scan service 571, a print service 572, a file use class 573, a network use class 574 and a panel use class 575.

Figure 31:
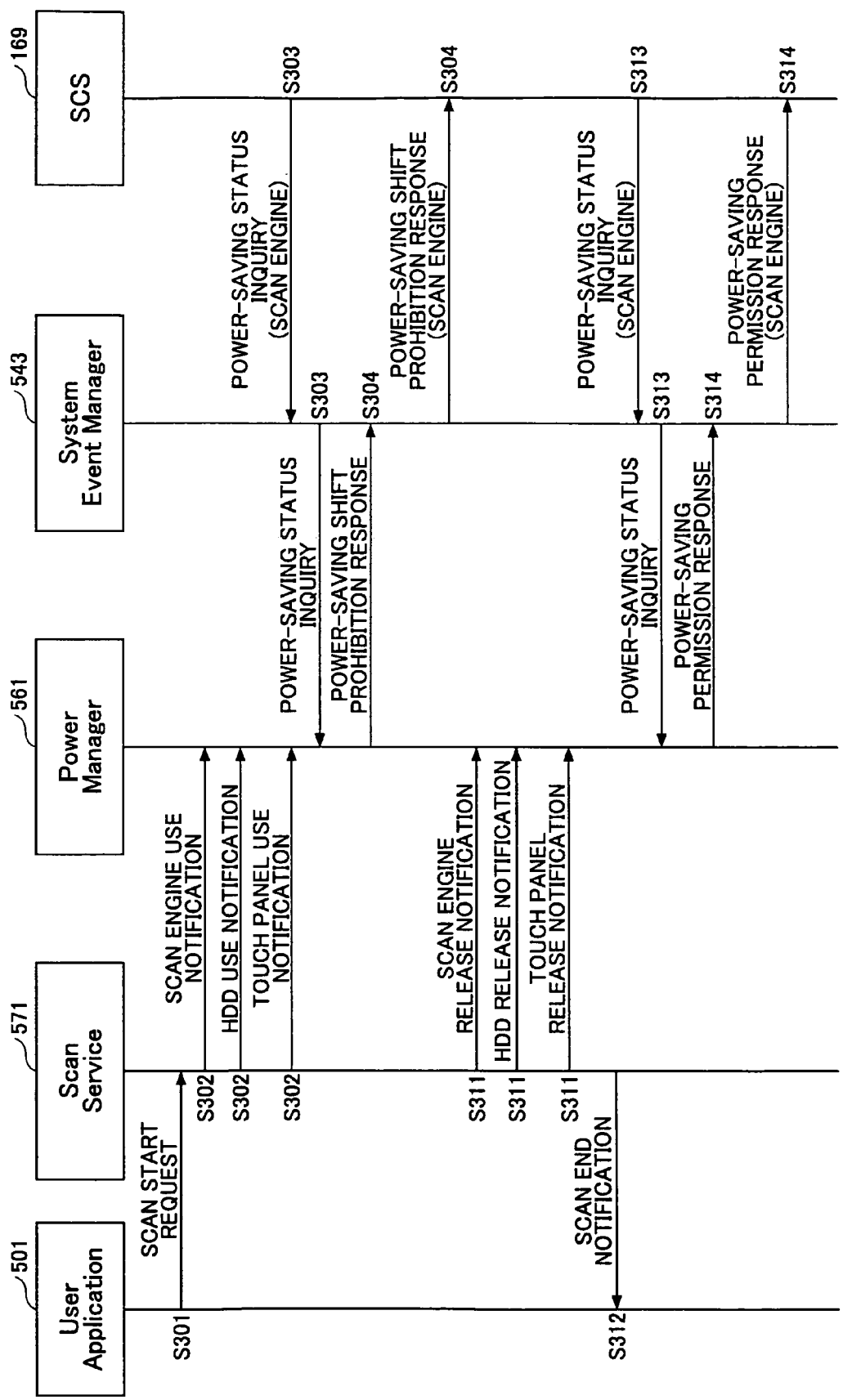
FIG. 31 is a flowchart of a first example of the power control of the combination machine.

FIG. 31 is a flowchart of a first example of the power control of the combination machine 101. When performing a scan process, the scan engine 121, the HDD 233 and touch panel 311 are used. Therefore, while the scan process is performed, the scanning engine 121, the HDD 233 and the touch panel 311, which are component devices used for the scan process, are prohibited from being shifted to power-saving.

A description will now be given of the power control by the power manager 561. When starting scanning, the user application 501 sends a scan start request to the scan service 571 (step S301). In response to the request, the scan service 571 sends a notification of use of each component device used in the scan process to the power manager 561 (step S302). Upon receipt of an inquiry setting these component devices in a power-saving state from the SCS 169 through the system event manager 543 thereafter (step S303), the power manager 561 sends to the SCS 169 through the system event manager 543 a response to prohibit these component devices from being shifted to power-saving (S304).

When ending the scanning, the scan service 571 sends an open notification of each component device used for the scan process to the power manager 561 (step S311), and also sends a scan end notification to the user application 501 (step S312). Upon receipt of an inquiry setting these component devices in a power-saving state from the SCS 169 through the system event manager 543 thereafter (step S313), the power manager 561 sends to the SCS 169 through the system event manager 543 a response to permit a shift to power-saving of these component devices (step S314). Thus, the power manager 561 prohibits the component devices used for the scan process from being shifted to power-saving. There is no need for the user application 501 to be conscious of the above-mentioned process.

Figure 32:
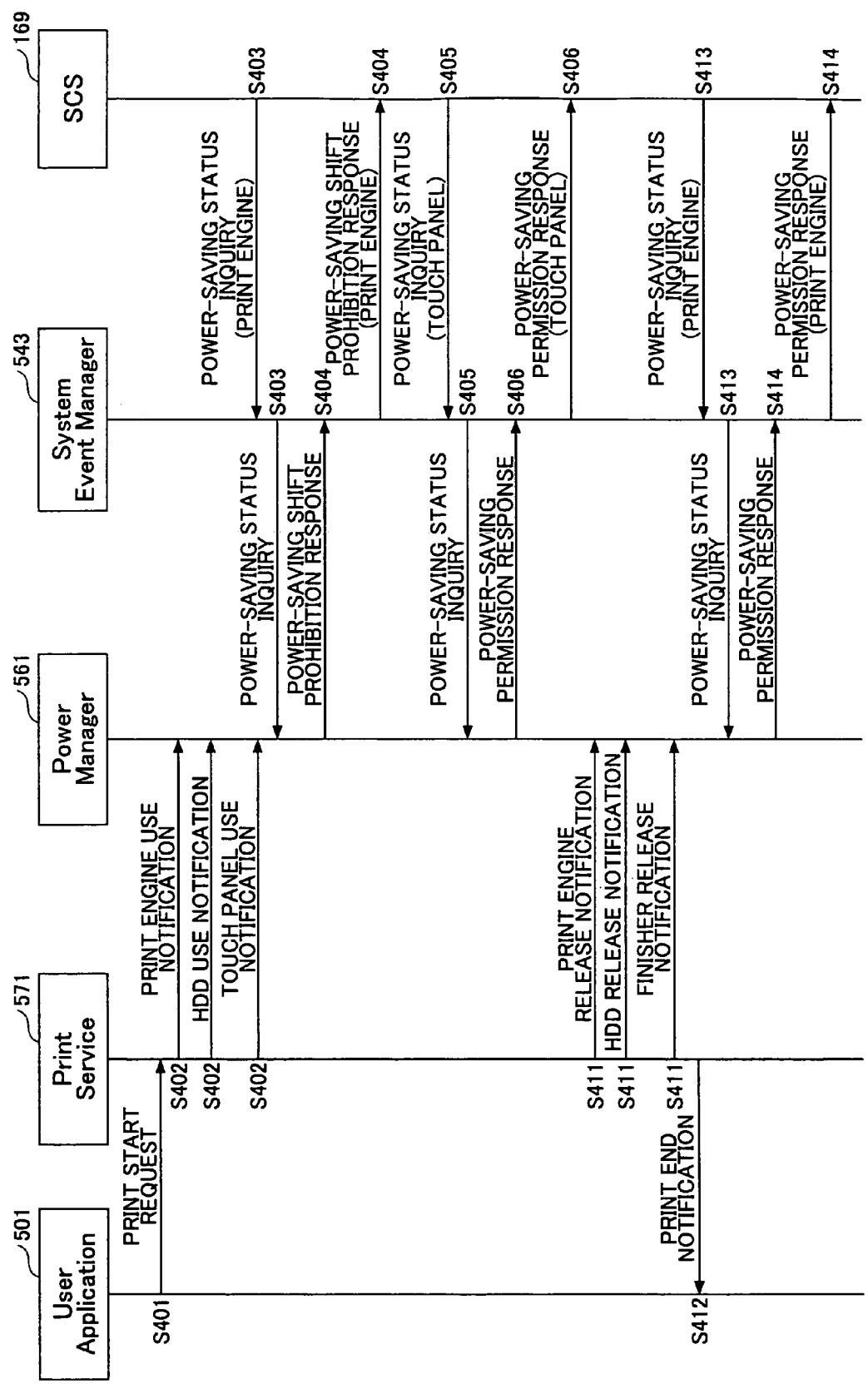
FIG. 32 is a flowchart of a second example of the power control of the combination machine.

FIG. 32 is a flowchart of a second example of the power control of the combination machine 101. When performing a printing process, the print engine 122, the HDD 233 and the finisher 303 are used. Therefore, while the printing process is performed, the print engine 122, the HDD 233 and the finisher 303, which are component devices used for the printing process, are prohibited from being shifted to power-saving.

A description will now be given of the power control by the power manager 561. When starting printing, the user application 501 sends a print start request to the print service 572 (step S401). In response to the request, the print service 572 sends a notification of use of each component device used in the printing process to the power manager 561 (step S402). Upon receipt of an inquiry of setting these component devices in a power-saving state from the SCS 169 through the system event manager 543 thereafter (step S403), the power manager 561 sends to the SCS 169 through the system event manager 543 a response to prohibit these component devices from being shifted to power-saving (S404). Upon receipt of an inquiry of setting devices other than these component devices in a power-saving state from the SCS 169 through the system event manager 543 thereafter (step S405), a response to permit a shift to power saving is sent (step S406).

When ending the printing, the print service 572 sends a release notification of each component device used for the printing process to the power manager 561 (step S411), and also sends a print end notification to the user application 501 (step S412). Upon receipt of an inquiry of setting these component devices in a power-saving state from the SCS 169 through the system event manager 543 thereafter (step S413), the power manager 561 sends to the SCS 169 through the system event manager 543 a response to permit a shift to power-saving of these component devices (step S414). Thus, the power manager 561 prohibits the component devices used for the printing process from being shifted to power-saving. There is no need for the user application 501 to be conscious of the above-mentioned process.

FIG. 33 is a flowchart of a third example of the power control of the combination machine 101. The JSDK application 147 is installed in the HDD or the SD card. If the JSDK application 147 is installed in the HDD, what is loaded to a memory during execution of the JSDK application 147 is a part of the JSDK application 147. Accordingly, if the HDD is shifted to a power-saving state while the JSDK application 147 installed in the HDD is performed, the execution of the JSDK application cannot be guaranteed. Thus, it is considered to cause the JSDK application 147 to perform a power control of the HDD or the SD card in which the JSDK application 147 is installed. However, it is difficult for the JSDK application 147 to perform a power control of the HDD or the SD card in which the JSDK application 147 is installed. Thus, when the JSDK application installed in the HDD 233 is executable and cannot be stopped, the JSDK platform prohibits the HDD 233 from being shifted to power-saving.

A description will be given below of the power control by the power manager 561. Upon receipt of an inquiry to set the HDD 233 to a power-saving state from the SCS 169 (step S501), the power manager 561 checks whether or not the application open class can be stopped (step S502) and also checks whether or not the JSDK application 147 can be stopped (step S503). The results as to whether or not they cab be stopped are announced to the machine state lock 562. Accordingly, the power manager 561 confirms the machine state lock 562 as to whether or not the applications can be stopped.

If the application open class can be stopped (step S502), the power manager 561 sends to the SCS 169 a response to prohibit the HDD 233 from being shifted to power-saving (step S511). If there is the JSDK application 147, which cannot be stopped, in the JSDK applications 147 (step S503), the power manager 561 checks location of installation of the JSDK application 147 concerned. The location of installation of the JSDK application is managed by the install manager 545. Thus, the power manager 561 inquires the install manager 545 of the location of installation of the JSDK application 147. If the JSDK application, which is being executed or can be stopped, is installed in the HDD 233 (step S504), the power manager 561 sends a response to the SCS 169 a response to prohibit the HDD 233 from being shifted to power-saving (step S511). If there is no JSDK application 147, which is being executed and can be stopped, is installed in the HDD 233 (steps S504 and S505), the power manager 561 sends to the SCS 169 a response to prohibit the HDD 233 from being shifted to power-saving (step S511). Accordingly, the power manager 561 can prohibit the HDD 233 from being shifted to power-saving if the JSDK application 147 is installed in the HDD 233. There is no need for the JSDK application 147 to be conscious of the above-mentioned process.

FIG. 34 is a flowchart of a fourth example of the power control of the combination machine 101. A printing process can be performed in the power-saving mode (light-off mode) in which a power supply to a heat is in a standby state, a power supply to a motor is in a standby state and a power supply to a panel is in a power-saving state. That is, the printing process can be performed either the touch panel 311 is in a standby state or a power-saving state. However, if an error occurs in the printing process when the combination machine 101 is in the power-saving mode, it is necessary to change the state of the touch panel 311 from the power-saving state to the standby state so as to display the fact that the error has occurred in the printing process. Therefore, if an error occurs in the printing process when the combination machine 101 is in the power-saving mode, the JSDK platform 148 changes the shift of the touch panel 311 to power-saving mode from permission to prohibition. Further, when the error is canceled, it is necessary to return the touch panel 311 from the standby state to the power-saving state. Thus, when an error in a printing process is cancelled when the combination machine 101 is in the power-saving mode, and the error of print processing is canceled, the JSDK platform 148 returns the shift of the touch panel 311 from prohibition to permission.

A description will be given below of the power control by the power manager 561. When starting printing, the user application 501 sends a print start request to the print service 572 (step S601). In response to the request, the print service 572 sends a notification of use of each component device used in the printing process to the power manager 561 (step S602). Upon receipt of an inquiry of setting these component devices in a power-saving state from the SCS 169 through the system event manager 543 thereafter (step S403), the power manager 561 sends to the SCS 169 through the system event manager 543 a response to prohibit these component devices from being shifted to power-saving (S604). Upon receipt of an inquiry of setting devices other than these component devices in a power-saving state, a response to permit a shift to power-saving is sent. Therefore, when an inquiry to set the touch panel 311 in a power-saving state is received thereafter (step S605), a response to permit the shift to power-saving is sent (step S606). At this time, it is assumed that the combination machine 101 is in the power-saving mode and the touch panel 311 in the power-saving state. Additionally, it is assumed that the combination machine 101 is performing a printing process.

If an error occurs in the printing process, the print service 572 sends an error occurrence notification to the user application 501 (step S611) and also sends an error occurrence notification to the power manager 561 (step S612). In response to the error occurrence notification, the power manager 561 sends a request to change the shift to power saving of the touch panel 311 from permission to prohibition to the SCS 169 through the system event manager 543 (step S613). When the error in the printing process is cancelled, the print service 572 sends an error cancellation notification to the user application 501 (step S621) and also sends an error cancellation notification to the power manager 561 (step S622).

In response to the error cancellation notification, the power manager 561 sends a request to change the shift to power saving of the touch panel 311 from prohibition to permission to the SCS 169 through the system event manager 543 (step S623). When ending the printing, the print service 572 sends a release notification of each component device used for the printing process to the power manager 561 (step S631), and also sends a print end notification to the user application 501 (step S632). Upon receipt of an inquiry of setting these component devices in a power-saving state from the SCS 169 through the system event manager 543 thereafter (step S633), the power manager 561 sends to the SCS 169 through the system event manager 543 a response to permit a shift to power-saving of these component devices (step S634).

Thus, the power manager 561 changes the status of the shift to power-saving of the touch panel 311 from permission to prohibition if an error occurs in the printing process when the combination machine 101 is in the power-saving mode, and, on the other hand, returns the status of the shift to power-saving of the touch panel 311 from prohibition to permission if an error occurring in the printing process is cancelled when the combination machine 101 is in the power-saving mode. There is no need for the JSDK application 147 to be conscious of the above-mentioned process. The JSDK application can perform the display of error occurrence without being conscious of the above-mentioned process.

(Variation)

The combination machine 101 of FIG. 1 corresponds to an embodiment of the present invention (image forming apparatus), and the information processing performed in the combination machine 101 of FIG. 1 corresponds to an embodiment the present invention (the information processing method). Each of the JSDK GUI manager 511, the task bar manager 512, the error application 513 and the rule application 514 shown in FIG. 5 corresponds to an embodiment of the present invention (information processing program). Each of the SD card and the CD-RO that stores the JSDK GUI manager 511, the task bar manager 512, the error application 513 and the rule application 514 shown in FIG. 5 corresponds to an embodiment of the present invention (recording media). Downloading of the information processing program or an option sale of these recording media is considered as a mode of use. The PC 701 of FIG. 27 corresponds to an embodiment of the present invention (terminal apparatus), and the information processing performed in the PC 701 of FIG. 27 corresponds to an embodiment of the present invention (information processing method). Each of the JSDK GUI manager 511, the task bar manager 512, the error application 513 and the rule application 514 shown in FIG. 28 corresponds to an embodiment of the present invention (information processing program). Each of the SD card and the CD-RO that store the JSDK GUI manager 511, the task bar manager 512, the error application 513 and the rule application 514 shown in FIG. 28 corresponds to an embodiment of the present invention (recording media). Downloading of the information processing program or an option sale of these recording media is considered as a mode of use.

The present invention is not limited to the specifically disclosed embodiments, and variations and modifications may be made without departing from the scope of the present invention.

Present application is based on Japanese priority applications No. 2004-040471 filed Feb. 17, 2004, No. 2005-32175 filed Feb. 8, 2005 and No. 2005-33318 filed Feb. 9, 2005, the entire contents of which are hereby incorporated herein by reference.

What is claimed is:

1. An apparatus, comprising:
a computer readable storage medium storing
programs encoding first application programs and a first platform that manages the first application programs, the first application programs including
a copy application program for copying;
a printer application program for a printer;
a scanner application program for a scanner;
a facsimile application program for a facsimile machine; and
a plurality of second application programs,
said plurality of second application programs including
an operation screen display application program managed by a second platform to display operation screens, said operation screen display application program being structurally independent of the copy, printer, scanner, and facsimile application programs, an application to occupy a screen being switched among the first application programs by an additional application program, said second platform including a managing part that determines whether a switching operation is performed based on a predetermined condition, the managing part is configured to determine whether the screen is not switched when either a rule violation or an error has occurred based on the predetermined condition, and user application programs developed by a first language and including application programs developed under said second platform, the user application programs being independent of the copy, printer, scanner, and facsimile application programs, said operation screen display application program operating on the user application programs as operation objects, and said second platform, which is for mediating the plurality of second application programs and software described in a second language different from the first language in which the plurality of second application programs are written, said second platform and one of said second application programs executed as one process on a same process, the operation screen display application program, the user application programs, and said second platform executed on an individual thread unit basis as a thread on the process, said operation screens being configured to operate the first application programs managed by said first platform.

2. The apparatus as claimed in claim 1, wherein the operation screens include a starting operation screen for starting an execution of one of the first application programs.

3. The apparatus as claimed in claim 1, wherein the operation screens include an ending operation screen for ending an execution of one of the first application programs.

4. The apparatus as claimed in claim 1, wherein the operation screens include an installing operation screen for installing an application program.

5. The apparatus as claimed in claim 1, wherein the operation screens include an uninstalling operation screen for uninstalling one of the first application programs.

6. The apparatus as claimed in claim 1, wherein said second platform executes an automatic updating process of an execution file of one of the first application programs in accordance with contents of a management file that manages information regarding one of the first application programs on an individual application program basis.

7. The apparatus as claimed in claim 1, wherein said second platform includes:
lump management means for managing the operation screen display application program, the user application programs, and said second platform; and
management means for managing said lump management means.

8. The apparatus as claimed in claim 1, wherein said second platform manages a life cycle of one of the first application programs.

9. The apparatus as claimed in claim 8, wherein the life cycle includes an initialized state, an active state, a stopped state and an ended state of the one of the first application programs.

10. The apparatus as claimed in claim 1, wherein said first application programs are translated from source codes to byte codes by a compiler so that the first application programs are executed according to a virtual machine.

11. The apparatus as claimed in claim 1, wherein each of the first application programs is an Xlet.

12. The apparatus as claimed in claim 1, wherein said second platform manages an initialized state, an active state, a stopped state and an ended state of the operation screen display application program, and the operation screen display application program is executed as a thread.

13. The apparatus as claimed in claim 1, wherein the second platform is configured to manage a lifecycle of the one of the second application programs.

14. The apparatus as claimed in claim 1, wherein the second platform includes a manager class that provides a thread group to produce a thread that manages a life cycle of the operation screen display application program.

15. An apparatus, comprising:
a computer readable storage medium storing
programs encoding first application programs and a first platform that manages the first application programs, the first application programs including
a copy application program for copying;
a printer application program for a printer;
a scanner application program for a scanner;
a facsimile application program for a facsimile machine; and
a plurality of second application programs,
said plurality of second application programs including
a task bar display application program managed by a second platform to display task bars on a screen, an application to occupy the screen switched among the first application programs by an additional application program, said task bar display application program being structurally independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, and
user application programs developed by a first language and including application programs developed under said second platform, the user application programs being independent of the copy, printer, scanner, and facsimile application programs, said task bar display application program operating on the user application programs as operation objects, and
said second platform, which is for mediating the plurality of second application programs and software described in a second language different from the first language in which the plurality of second application programs are written, said second platform and one of said plurality of second application programs executed as one process on a same process, the task bar display application program, the user application programs, and said second platform executed on an individual thread unit basis as a thread on the process,
said task bars being configured to operate the first application programs managed by said first platform.

16. The apparatus as claimed in claim 15, wherein said task bars include a switching task bar for switching between the first application programs that occupy the screen.

17. An apparatus, comprising:
a computer readable storage medium storing
programs encoding first application programs and a first platform that manages the first application programs, the first application programs including
a copy application program for copying;
a printer application program for a printer;
a scanner application program for a scanner;
a facsimile application program for a facsimile machine; and
a plurality of second application programs, an application to occupy a screen switched among the first application programs by an additional application program,
said plurality of second application programs including
an error occurrence output application program managed by a second platform to output information regarding an occurrence of an error when the error has occurred in an execution of one of the first application programs managed by said first platform, said error occurrence output application program being structurally independent of the copy, printer, scanner, and facsimile application programs, said second platform including a managing part that determines whether a switching operation is performed based on a predetermined condition, the managing part is configured to determine whether the screen is not switched when either a rule violation or the error has occurred based on the predetermined condition, and
user application programs developed by a first language and including application programs developed under said second platform, the user application programs being independent of the copy, printer, scanner, and facsimile application programs, said error occurrence output application program operating on the user application programs as operation objects, and
said second platform, which is for mediating the plurality of second application programs and software described in a second language different from the first language in which the plurality of second application programs are written, said second platform and one of said plurality of second application programs executed as one process on a same process, the error occurrence output application program, the user application programs, and said second platform executed on an individual thread unit basis as a thread on the process.

18. An apparatus, comprising:
a computer readable storage medium storing
programs encoding first application programs and a first platform that manages the first application programs, the first application programs including
a copy application program for copying;
a printer application program for a printer;
a scanner application program for a scanner;
a facsimile application program for a facsimile machine; and
a plurality of second application programs, an application to occupy a screen switched among the first application programs by an additional application program,
said plurality of second application programs including
a rule violation output application program managed by a second platform to output information indicating an occurrence of a rule violation when the rule violation has occurred in a process request for one of the first application programs managed by said first platform, said rule violation output application program being structurally independent of the copy, printer, scanner, and facsimile application programs, said second platform including a managing part that determines whether a switching operation is performed based on a predetermined condition, the managing part is configured to determine whether the screen is not switched when either the rule violation or an error has occurred based on the predetermined condition, and user application programs developed by a first language and including application programs developed under said second platform, the user application programs being independent of the copy, printer, scanner, and facsimile application programs, said rule violation output application program operating on the user application programs as operation objects, and said second platform, which is for mediating the plurality of second application programs and software described in a second language different from the first language in which the plurality of second application programs are written, said second platform and one of said plurality of second application programs executed as one process on a same process, the rule violation output application program, the user application programs, and said second platform executed on an individual thread unit basis as a thread on the process.

19. An image processing method performed in an apparatus having a first platform that manages first application programs, the image processing method comprising:

displaying, with the apparatus, an operation screen so that an object to be operated by the operation screen is one of the first application programs managed by said first platform, an application to occupy a screen switched among the first application programs by an additional application program, the first application programs including a copy application program for copying, a printer application program for a printer, a scanner application program for a scanner, and a facsimile application program for a facsimile machine, a display of the operation screen being executed by an operation screen display application program of a plurality of second application programs of the first application programs managed by a second platform, said operation screen display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said operation screen display application program operating on the user application programs as operation objects; and executing said second platform and one of said plurality of second application programs as one process on a same process, the operation screen display application program of said plurality of second application programs, the user application programs, and said second platform executed on an individual thread unit basis as a thread on the process, the second platform mediating the plurality of second application programs and software described in a second language different from the first language in which the plurality of second application programs are written.

20. An image processing method performed in an apparatus having a first platform that manages first application programs, the image processing method comprising:

displaying, with the apparatus, a task bar on a screen so that an object to be operated by said task bar is one of the first application programs managed by said first platform, an application to occupy the screen switched among the first application programs by an additional application program, the first application programs including a copy application program for copying, a printer application program for a printer, a scanner application program for a scanner, and a facsimile application program for a facsimile machine, a display of the task bar being executed by a task bar display application program of a plurality of second application programs of the first application programs managed by a second platform, said task bar display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said task bar display application program operating on the user application programs as operation objects; and executing said second platform and one of said plurality of second application programs as one process on a same process, the task bar display application program of said plurality of second application programs, the user application programs, and said second platform executed on an individual thread unit basis as a thread on the process, the second platform mediating the plurality of second application programs and software described in a second language different from the first language in which the plurality of second application programs are written.

21. An image processing method performed in an apparatus having a first platform that manages first application programs, the image processing method comprising:

outputting, with the apparatus, information regarding an occurrence of an error when the error has occurred in an execution of one of the first application programs managed by said first platform, the first application programs including a copy application program for copying, a printer application program for a printer, a scanner application program for a scanner, and a facsimile application program for a facsimile machine, an application to occupy a screen switched among the first application programs by an additional application program, an output of the information being performed by an error occurrence output application program of a plurality of second application programs of the first application programs managed by a second platform, said error occurrence output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or the error has occurred based on the predetermined condition, said error occurrence output application program operating on the user application programs as operation objects; and executing said second platform and one of said plurality of second application programs as one process on a same process, the error occurrence output application program of said plurality of second application programs, the user application programs, and said second platform executed on an individual thread unit basis as a thread on the process, the second platform mediating the plurality of second application programs and software described in a second language different from the first language in which the plurality of second application programs are written.

22. An image processing method performed in an apparatus having a first platform that manages first application programs, the image processing method comprising:

outputting, with the apparatus, information indicating an occurrence of a rule violation when the rule violation has occurred in a process request for one of the first application programs managed by said first platform, the first application programs including a copy application program for copying, a printer application program for a printer, a scanner application program for a scanner, and a facsimile application program for a facsimile machine, an application to occupy a screen switched among the first application programs by an additional application program, an output of the information being performed by a rule violation output application program of a plurality of second application programs of the first application programs managed by a second platform, said rule violation output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either the rule violation or an error has occurred based on the predetermined condition, said rule violation output application program operating on the user application programs as operation objects; and executing said second platform and one of said plurality of second application programs as one process on a same process, the rule violation output application program of said plurality of second application programs, the user application programs, and said second platform executed on an individual thread unit basis as a thread on the process, the second platform mediating the plurality of second application programs and software described in a second language different from the first language in which the plurality of second application programs are written.

23. A computer readable, non-transitory recording medium storing an image processing program that causes an apparatus to perform an image processing method, the apparatus having a first platform that manages first application programs, the image processing method comprising:

displaying an operation screen so that an object to be operated by the operation screen is one of the first application programs managed by said first platform, an application to occupy a screen switched among the first application programs by an additional application program, the first application programs including a copy application program for copying, a printer application program for a printer, a scanner application program for a scanner, and a facsimile application program for a facsimile machine, a display of the operation screen being executed by an operation screen display application program of a plurality of second application programs of the first application programs managed by a second platform, said operation screen display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said operation screen display application program operating on the user application programs as operation objects; and executing said second platform and one of said plurality of second application programs as one process on a same process, the operation screen display application program of said plurality of second application programs, the user application programs, and said second platform executed on an individual thread unit basis as a thread on the process, the second platform mediating the plurality of second application programs and software described in a second language different from the first language in which the plurality of second application programs are written.

24. A computer readable, non-transitory recording medium storing an image processing program that causes an apparatus to perform an image processing method, the apparatus having a first platform that manages first application programs, the image processing method comprising:

displaying a task bar on a screen so that an object to be operated by said task bar is one of the first application programs managed by said first platform, an application to occupy the screen switched among the first application programs by an additional application program, the first application programs including a copy application program for copying, a printer application program for a printer, a scanner application program for a scanner, and a facsimile application program for a facsimile machine, a display of the task bar being executed by a task bar display application program of a plurality of second application programs of the first application programs managed by a second platform, said task bar display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said task bar display application program operating on the user application programs as operation objects; and executing said second platform and one of said plurality of second application programs as one process on a same process, the task bar display application program of said plurality of second application programs, the user application programs, and said second platform executed on an individual thread unit basis as a thread on the process, the second platform mediating the plurality of second application programs and software described in a second language different from the first language in which the plurality of second application programs are written.

25. A computer readable, non-transitory recording medium storing an image processing program that causes an apparatus to perform an image processing method, the apparatus having a first platform that manages first application programs, the image processing method comprising:

outputting information regarding an occurrence of an error when the error has occurred in an execution of one of the first application programs managed by said first platform, the first application programs including a copy application program for copying, a printer application program for a printer, a scanner application program for a scanner, and a facsimile application program for a facsimile machine, an application to occupy a screen switched among the first application programs by an additional application program, an output of the information being performed by an error occurrence output application program of a plurality of second application programs of the first application programs managed by a second platform, said error occurrence output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or the error has occurred based on the predetermined condition, said error occurrence output application program operating on the user application programs as operation objects; and executing said second platform and one of said plurality of second application programs as one process on a same process, the error occurrence output application program of said plurality of second application programs, the user application programs, and said second platform executed on an individual thread unit basis as a thread on the process, the second platform mediating the plurality of second application programs and software described in a second language different from the first language in which the plurality of second application programs are written.

26. A computer readable, non-transitory recording medium storing an image processing program that causes an apparatus to perform an image processing method, the apparatus having a first platform that manages first application programs, the image processing method comprising:

outputting information indicating an occurrence of a rule violation when the rule violation has occurred in a process request for one of the first application programs managed by said first platform, the first application programs including a copy application program for copying, a printer application program for a printer, a scanner application program for a scanner, and a facsimile application program for a facsimile machine, an application to occupy a screen switched among the first application programs by an additional application program, an output of the information being performed by a rule violation output application program of a plurality of second application programs of the first application programs managed by a second platform, said rule violation output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either the rule violation or an error has occurred based on the predetermined condition., said rule violation output application program operating on the user application programs as operation objects; and executing said second platform and one of said plurality of second application programs as one process on a same process, the rule violation output application program of said plurality of second application programs, the user application programs, and said second platform executed on an individual thread unit basis as a thread on the process, the second platform mediating the plurality of second application programs and software described in a second language different from the first language in which the plurality of second application programs are written.

27. A terminal apparatus that serves as an emulator of an apparatus, the terminal apparatus comprising:

a computer readable storage medium storing
programs encoding first application programs and a first platform that manages the first application programs, the first application programs including
a copy application program for copying;
a printer application program for a printer;
a scanner application program for a scanner;
a facsimile application program for a facsimile machine; and
a plurality of second application programs,
said plurality of second application programs including
an operation screen display application program managed by a second platform of said terminal apparatus to display operation screens, said operation screen display application program being structurally independent of the copy, printer, scanner, and facsimile application programs, an application to occupy a screen switched among the first application programs by an additional application program, said second platform including a managing part that determines whether a switching operation is performed based on a predetermined condition, the managing part is configured to determine whether the screen is not switched when either a rule violation or an error has occurred based on the predetermined condition, and user application programs developed by a first language and including application programs developed under said second platform, the user application programs being independent of the copy, printer, scanner, and facsimile application programs, said operation screen display application program operating on the user application programs as operation objects, and said second platform, which is for mediating the plurality of second application programs and software described in a second language different from the first language in which the plurality of second application programs are written, said second platform and one of said second application programs executed as one process on a same process, the operation screen display application program, the user application programs, and said second platform executed on an individual thread unit basis as a thread on the process, said operation screens being configured to operate the first application programs managed by said first platform of said terminal apparatus or a platform of said apparatus.

28. A terminal apparatus that serves as an emulator of an apparatus, the terminal apparatus comprising:

a computer readable storage medium storing programs encoding first application programs and a first platform that manages the first application programs, the first application programs including a copy application program for copying;

a printer application program for a printer;

a scanner application program for a scanner;

a facsimile application program for a facsimile machine; and a plurality of second application programs, said plurality of second application programs including a task bar display application program managed by a second platform of said terminal apparatus to display task bars on a screen, an application to occupy the screen switched among the first application programs by an additional application program, said second platform including a managing part that determines whether a switching operation is performed based on a predetermined condition, the managing part is configured to determine whether the screen is not switched when either a rule violation or an error has occurred based on the predetermined condition, said task bar display application program being structurally independent of the copy, printer, scanner, and facsimile application programs, and user application program developed by a first language and including application programs developed under said second platform, the user application programs being independent of the copy, printer, scanner, and facsimile application programs, said task bar display application program operating on the user application programs as operation objects, and said second platform, which is for mediating the plurality of second application programs and software described in a second language different from the first language in which the plurality of second application programs are written, said second platform and one of said second application programs executed as one process on a same process, the task bar display application program, the user application programs, and said second platform executed on an individual thread unit basis as a thread on the process, said task bars being configured to operate the first application programs managed by said first platform of said terminal apparatus or a platform of said apparatus.

29. A terminal apparatus that serves as an emulator of an apparatus, the terminal apparatus comprising:

a computer readable storage medium storing programs encoding first application programs and a first platform that manages the first application programs, the first application programs including a copy application program for copying;

a printer application program for a printer;

a scanner application program for a scanner;

a facsimile application program for a facsimile machine; and a plurality of second application programs, an application to occupy a screen switched among the first application programs by an additional application program, said plurality of second application programs including an error occurrence output application program managed by a second platform of said terminal apparatus to output information regarding an occurrence of an error when the error has occurred in an execution of one of the first application programs managed by said first platform of said terminal apparatus or a platform of said apparatus, said error occurrence output application program being structurally independent of the copy, printer, scanner, and facsimile application programs, said second platform including a managing part that determines whether a switching operation is performed based on a predetermined condition, the managing part is configured to determine whether the screen is not switched when either a rule violation or the error has occurred based on the predetermined condition., and user application programs developed by a first language and including application programs developed under said second platform, the user application programs being independent of the copy, printer, scanner, and facsimile application programs, said error occurrence output application program operating on the user application programs as operation objects, and said second platform, which is for mediating the plurality of second application programs and software described in a second language different from the first language in which the plurality of second application programs are written, said second platform and one of said second application programs executed as one process on a same process, the error occurrence output application program, the user application programs, and said second platform executed on an individual thread unit basis as a thread on the process.

30. A terminal apparatus that serves as an emulator of an apparatus, the terminal apparatus comprising:
a computer readable storage medium storing
programs encoding first application programs and a first platform that manages the first application programs, the first application programs including
a copy application program for copying;
a printer application program for a printer;
a scanner application program for a scanner;
a facsimile application program for a facsimile machine; and
a plurality of second application programs, an application to occupy a screen switched among the first application programs by an additional application program,
said plurality of second application programs including
a rule violation output application program managed by a second platform of said terminal apparatus to output information indicating an occurrence of a rule violation when the rule violation has occurred in a process request for one of the first application programs managed by said first platform of said terminal apparatus or a platform of said apparatus, said rule violation output application program being structurally independent of the copy, printer, scanner, and facsimile application programs, said second platform including a managing part that determines whether a switching operation is performed based on a predetermined condition, the managing part is configured to determine whether the screen is not switched when either the rule violation or an error has occurred based on the predetermined condition, and
user application programs developed by a first language and including application programs developed under said second platform, the user application programs being independent of the copy, printer, scanner, and facsimile application programs, said rule violation output application program operating on the user application programs as operation objects, and
said second platform, which is for mediating the plurality of second application programs and software described in a second language different from the first language in which the plurality of second application programs are written, said second platform and one of said second application programs executed as one process on a same process, the rule violation output application program, the user application programs, and said second platform executed on an individual thread unit basis as a thread on the process.

31. An image processing method performed in a terminal apparatus serving as an emulator of an apparatus, said terminal apparatus having a first platform that manages first application programs, the image processing method comprising:
displaying, with the terminal apparatus, an operation screen so that an object to be operated by the operation screen is one of the first application programs managed by said first platform or a platform of said apparatus, an application to occupy a screen switched among the first application programs by an additional application program, the first application programs including a copy application program for copying, a printer application program for a printer, a scanner application program for a scanner, and a facsimile application program for a facsimile machine, a display of the operation screen being executed by an operation screen display application program of a plurality of second application programs of the first application programs managed by a second platform of said terminal apparatus, said operation screen display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said operation screen display application program operating on the user application programs as operation objects; and
executing said second platform and one of said plurality of second application programs as one process on a same process, the operation screen display application program of said plurality of second application programs, the user application programs, and said second platform executed on an individual thread unit basis as a thread on the process, the second platform mediating the plurality of second application programs and software described in a second language different from the first language in which the plurality of second application programs are written.

32. An image processing method performed in a terminal apparatus serving as an emulator of an apparatus, said terminal apparatus having a first platform that manages first application programs, the image processing method comprising:
displaying, with the terminal apparatus, a task bar on a screen so that an object to be operated by said task bar is one of the first application programs managed by said first platform of said terminal apparatus or a platform of said apparatus, an application to occupy the screen switched among the first application programs by an additional application program, the first application programs including a copy application program for copying, a printer application program for a printer, a scanner application program for a scanner, and a facsimile application program for a facsimile machine, a display of the task bar being executed by a task bar display application program of a plurality of second application programs of the first application programs managed by a second platform of said terminal apparatus, said task bar display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said task bar display application program operating on the user application programs as operation objects; and executing said second platform and one of said plurality of second application programs as one process on a same process, the task bar display application program of said plurality of second application programs, the user application programs, and said second platform executed on an individual thread unit basis as a thread on the process, the second platform mediating the plurality of second application programs and software described in a second language different from the first language in which the plurality of second application programs are written.

33. An image processing method performed in a terminal apparatus serving as an emulator of an apparatus, said terminal apparatus having a first platform that manages first application programs, the image processing method comprising:

outputting, with the terminal apparatus, information regarding an occurrence of an error when the error has occurred in an execution of one of the first application programs managed by said first platform of said terminal apparatus or a platform of said apparatus, the first application programs including a copy application program for copying, a printer application program for a printer, a scanner application program for a scanner, and a facsimile application program for a facsimile machine, an application to occupy a screen switched among the first application programs by an additional application program, an output of the information being performed by an error occurrence output application program of a plurality of second application programs of the first application programs managed by a second platform, said error occurrence output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or the error has occurred based on the predetermined condition., said error occurrence output application program operating on the user application programs as operation objects; and executing said second platform and one of said plurality of second application programs as one process on a same process, the error occurrence output application program of said plurality of second application programs, the user application programs, and said second platform executed on an individual thread unit basis as a thread on the process, the second platform mediating the plurality of second application programs and software described in a second language different from the first language in which the plurality of second application programs are written.

34. An image processing method performed in a terminal apparatus serving as an emulator of an apparatus, said terminal apparatus having a first platform that manages first application programs, the image processing method comprising:

outputting, with the terminal apparatus, information indicating an occurrence of a rule violation when the rule violation has occurred in a process request for one of the first application programs managed by said first platform of said terminal apparatus or a platform of said apparatus, the first application programs including a copy application program for copying, a printer application program for a printer, a scanner application program for a scanner, and a facsimile application program for a facsimile machine, an application to occupy a screen switched among the first application programs by an additional application program, an output of the information being performed by a rule violation output application program of a plurality of second application programs of the first application programs managed by a second platform of said terminal apparatus, said rule violation output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either the rule violation or an error has occurred based on the predetermined condition, said rule violation output application program operating on the user application programs as operation objects; and executing said second platform and one of said plurality of second application programs as one process on a same process, the rule violation output application program of said plurality of second application programs, the user application programs, and said second platform executed on an individual thread unit basis as a thread on the process, the second platform mediating the plurality of second application programs and software described in a second language different from the first language in which the plurality of second application programs are written.

35. A computer readable, non-transitory recording medium storing an image forming program that causes a terminal apparatus to perform an image processing method performed in the terminal apparatus when serving as an emulator of an apparatus, said terminal apparatus having a first platform that manages first application programs, the image processing method comprising:

displaying an operation screen so that an object to be operated by the operation screen is one of the first application programs managed by said first platform or a platform of said apparatus, an application to occupy a screen switched among the first application programs by an additional application program, the first application programs including a copy application program for copying, a printer application program for a printer, a scanner application program for a scanner, and a facsimile application program for a facsimile machine, a display of the operation screen being executed by an operation screen display application program of a plurality of second application programs of the first application programs managed by a second platform of said terminal apparatus, said operation screen display application program being structurally independent of the copy, printer, scanner, and facsimile application programs, the plurality of second application programs including user application program developed by a first language and including application programs developed under the second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said operation screen display application program operating on the user application programs as operation objects; and executing said second platform and one of said plurality of second application programs as one process on a same process, the operation screen display application program of said plurality of second application programs, the user application programs, and said second platform executed on an individual thread unit basis as a thread on the process, the second platform mediating the plurality of second application programs and software described in a second language different from the first language in which the plurality of second application programs are written.

36. A computer readable, non-transitory recording medium storing an image forming program that causes a terminal apparatus to perform an image processing method performed in the terminal apparatus when serving as an emulator of an apparatus, said terminal apparatus having a first platform that manages first application programs, the image processing method comprising:

displaying a task bar on a screen so that an object to be operated by said task bar is one of the first application programs managed by said first platform of said terminal apparatus or a platform of said apparatus, an application to occupy the screen switched among the first application programs by an additional application program, the first application programs including a copy application program for copying, a printer application program for a printer, a scanner application program for a scanner, and a facsimile application program for a facsimile machine, a display of the task bar being executed by a task bar display application program of a plurality of second application programs of the first application programs managed by a second platform of said terminal apparatus, said task bar display application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or an error has occurred based on the predetermined condition, said task bar display application program operating on the user application programs as operation objects; and executing said second platform and one of said plurality of second application programs as one process on a same process, the task bar display application program of said plurality of second application programs, the user application programs, and said second platform executed on an individual thread unit basis as a thread on the process, the second platform mediating the plurality of second application programs and software described in a second language different from the first language in which the plurality of second application programs are written.

37. A computer readable, non-transitory recording medium storing an image forming program that causes a terminal apparatus to perform an image processing method performed in the terminal apparatus when serving as an emulator of an apparatus, said terminal apparatus having a first platform that manages first application programs, the image processing method comprising:

outputting information regarding an occurrence of an error when the error has occurred in an execution of one of the first application programs managed by said first platform of said terminal apparatus or a platform of said apparatus, the first application programs including a copy application program for copying, a printer application program for a printer, a scanner application program for a scanner, and a facsimile application program for a facsimile machine, an application to occupy a screen switched among the first application programs by an additional application program, an output of the information being performed by an error occurrence output application program of a plurality of second application programs of the first application programs managed by a second platform, said error occurrence output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either a rule violation or the error has occurred based on the predetermined condition, said error occurrence output application program operating on the user application programs as operation objects; and executing said second platform and one of said plurality of second application programs as one process on a same process, the error occurrence output application program of said plurality of second application programs, the user application programs, and said second platform executed on an individual thread unit basis as a thread on the process, the second platform mediating the plurality of second application programs and software described in a second language different from the first language in which the plurality of second application programs are written.

38. A computer readable, non-transitory recording medium storing an image forming program that causes a terminal apparatus to perform an image processing method performed in the terminal apparatus when serving as an emulator of an apparatus, said terminal apparatus having a first platform that manages first application programs, the image processing method comprising:

outputting information indicating an occurrence of a rule violation when the rule violation has occurred in a process request for one of the first application programs managed by said first platform of said terminal apparatus or a platform of said apparatus, the first application programs including a copy application program for copying, a printer application program for a printer, a scanner application program for a scanner, and a facsimile application program for a facsimile machine, an application to occupy a screen switched among the first application programs by an additional application program, an output of the information being performed by a rule violation output application program of a plurality of second application programs of the first application programs managed by a second platform of said terminal apparatus, said rule violation output application program being structurally independent of the copy, printer, scanner, and facsimile application programs, the plurality of second application programs including user application programs developed by a first language and including application programs developed under said second platform, the user application programs being independent of the copy, printer, scanner, and facsimile application programs, said second platform including a managing part that determines whether a switching operation is performed based on a predetermined condition, the managing part is configured to determine whether the screen is not switched when either the rule violation or an error has occurred based on the predetermined condition., said rule violation output application program operating on the user application programs as operation objects; and executing said second platform and one of said plurality of second application programs as one process on a same process, the rule violation output application program of said plurality of second application programs, the user application programs, and said second platform executed on an individual thread unit basis as a thread on the process, the second platform mediating the plurality of second application programs and software described in a second language different from the first language in which the plurality of second application programs are written.

\* \* \* \* \*